(12) United States Patent
Harkins

(10) Patent No.: US 11,845,384 B2
(45) Date of Patent: Dec. 19, 2023

(54) TOOLBOX

(71) Applicant: Wesley Harkins, Hereford, TX (US)

(72) Inventor: Wesley Harkins, Hereford, TX (US)

(73) Assignee: Ruf N It Harkins LLC, Hereford, TX (US)

( * ) Notice: Subject to any disclaimer, the term of this patent is extended or adjusted under 35 U.S.C. 154(b) by 159 days.

(21) Appl. No.: 17/224,804

(22) Filed: Apr. 7, 2021

(65) Prior Publication Data

US 2021/0316670 A1    Oct. 14, 2021

Related U.S. Application Data

(60) Provisional application No. 63/008,433, filed on Apr. 10, 2020.

(51) Int. Cl.
*B60R 11/06* (2006.01)
*B60R 9/02* (2006.01)

(52) U.S. Cl.
CPC ............... *B60R 11/06* (2013.01); *B60R 9/02* (2013.01)

(58) Field of Classification Search
CPC .. B60R 11/06; B60R 9/02; B25H 3/00; B25H 3/02; A47F 5/0838
USPC ..... 211/103, 208; 224/565; 248/220.21, 243
See application file for complete search history.

(56) References Cited

U.S. PATENT DOCUMENTS

| | | | |
|---|---|---|---|
| 3,512,654 A * | 5/1970 | Jay | A47B 96/145 411/356 |
| 3,794,183 A * | 2/1974 | Colbridge | A47B 46/00 211/208 |
| 4,138,019 A * | 2/1979 | Smith | A47F 5/0807 248/220.31 |
| 4,450,989 A * | 5/1984 | Bogar, Jr. | A47B 81/005 224/571 |
| 4,501,457 A * | 2/1985 | Pond | A47B 5/06 224/567 |
| 5,125,518 A | 6/1992 | Ward | |
| 5,221,132 A * | 6/1993 | Combs | B25H 3/04 211/DIG. 1 |
| 5,740,883 A | 4/1998 | Trank | |
| 5,845,952 A * | 12/1998 | Albertini | B60P 3/14 296/24.45 |
| 6,113,202 A | 9/2000 | Germano | |
| 6,578,937 B1 | 6/2003 | Thoman | |

(Continued)

FOREIGN PATENT DOCUMENTS

| | | | | |
|---|---|---|---|---|
| DE | 202011004931 U1 * | 8/2012 | ............ | A47F 5/0093 |
| EP | 2225971 A1 * | 9/2010 | ............. | A47B 57/16 |
| EP | 4029657 A1 * | 7/2022 | ............... | B25H 1/02 |

*Primary Examiner* — Justin M Larson
(74) *Attorney, Agent, or Firm* — Shannon Warren

(57) ABSTRACT

A toolbox accessory system for organizing and utilizing a utility box of a truck. The toolbox accessory system comprises one or more rail assemblies attached to one or more back walls of the utility box. The toolbox accessory system comprises one or more accessory assemblies configured to selectively attach to the one or more rail assemblies. The one or more accessory assemblies are configured to selectively store tools within one or more utility boxes. The one or more accessory assemblies are attached in a vertical configuration along the one or more back walls of the one or more utility boxes. A box shell comprises the one or more back walls, a top portion, a bottom portion, two side walls, and a front opening.

20 Claims, 29 Drawing Sheets

(56) References Cited

U.S. PATENT DOCUMENTS

| | | | | |
|---|---|---|---|---|
| 6,591,995 B1 * | 7/2003 | Grove | A47F 5/0815 | 211/87.01 |
| 6,619,772 B2 | 9/2003 | Dierbeck | | |
| 6,932,225 B2 * | 8/2005 | Rowe | A47B 57/30 | 211/90.02 |
| 7,052,067 B2 * | 5/2006 | Walker | B60R 11/02 | 296/37.6 |
| 7,510,078 B2 * | 3/2009 | Schmidt | B25H 3/003 | 206/372 |
| 7,798,336 B2 * | 9/2010 | Shiao | B25H 3/04 | 211/DIG. 1 |
| D633,719 S * | 3/2011 | Koehn | D3/318 | |
| 7,946,663 B2 * | 5/2011 | Holcomb | E05B 65/46 | 312/217 |
| 8,011,484 B2 * | 9/2011 | McIntyre | A45C 5/04 | 190/110 |
| 8,061,539 B2 * | 11/2011 | Punzel | A47B 47/021 | 248/220.21 |
| 8,146,755 B2 * | 4/2012 | Schwartzkopf | A47F 5/0838 | 211/103 |
| 8,177,079 B2 * | 5/2012 | Schwartzkopf | A47F 5/101 | 211/94.01 |
| 8,210,368 B2 * | 7/2012 | Schwartzkopf | A47B 96/061 | 211/103 |
| 8,550,259 B1 * | 10/2013 | McCoy | H02G 3/30 | 211/13.1 |
| 8,636,154 B2 * | 1/2014 | Chinn | A61G 3/0891 | 211/106.01 |
| 9,434,321 B2 * | 9/2016 | Perron | A47B 49/004 | |
| 9,597,792 B1 * | 3/2017 | Kao | B25H 3/04 | |
| 9,914,209 B2 | 3/2018 | Grela | | |
| 10,398,203 B2 * | 9/2019 | Schroeder | A45C 3/02 | |
| 10,952,534 B2 * | 3/2021 | Peck | A47F 5/0815 | |
| 11,489,325 B2 * | 11/2022 | McCoy | F16L 3/137 | |
| 11,490,700 B2 * | 11/2022 | Schroeder | A45C 3/02 | |
| 2008/0179203 A1 * | 7/2008 | Mueller | B25H 1/12 | 206/216 |
| 2011/0192810 A1 * | 8/2011 | Kao | B25H 3/028 | 211/70.6 |
| 2012/0085721 A1 * | 4/2012 | Michael J. | A47F 5/0853 | 211/103 |
| 2012/0261450 A1 * | 10/2012 | Moore | B25H 3/02 | 224/404 |
| 2017/0057425 A1 | 3/2017 | Pulleyblank | | |
| 2019/0152409 A1 * | 5/2019 | Klatt | B60R 11/06 | |
| 2021/0068574 A1 * | 3/2021 | Riepe | E05G 1/026 | |
| 2021/0316670 A1 * | 10/2021 | Harkins | B60R 9/02 | |
| 2022/0111912 A1 * | 4/2022 | McKinney | B62D 25/2054 | |

* cited by examiner

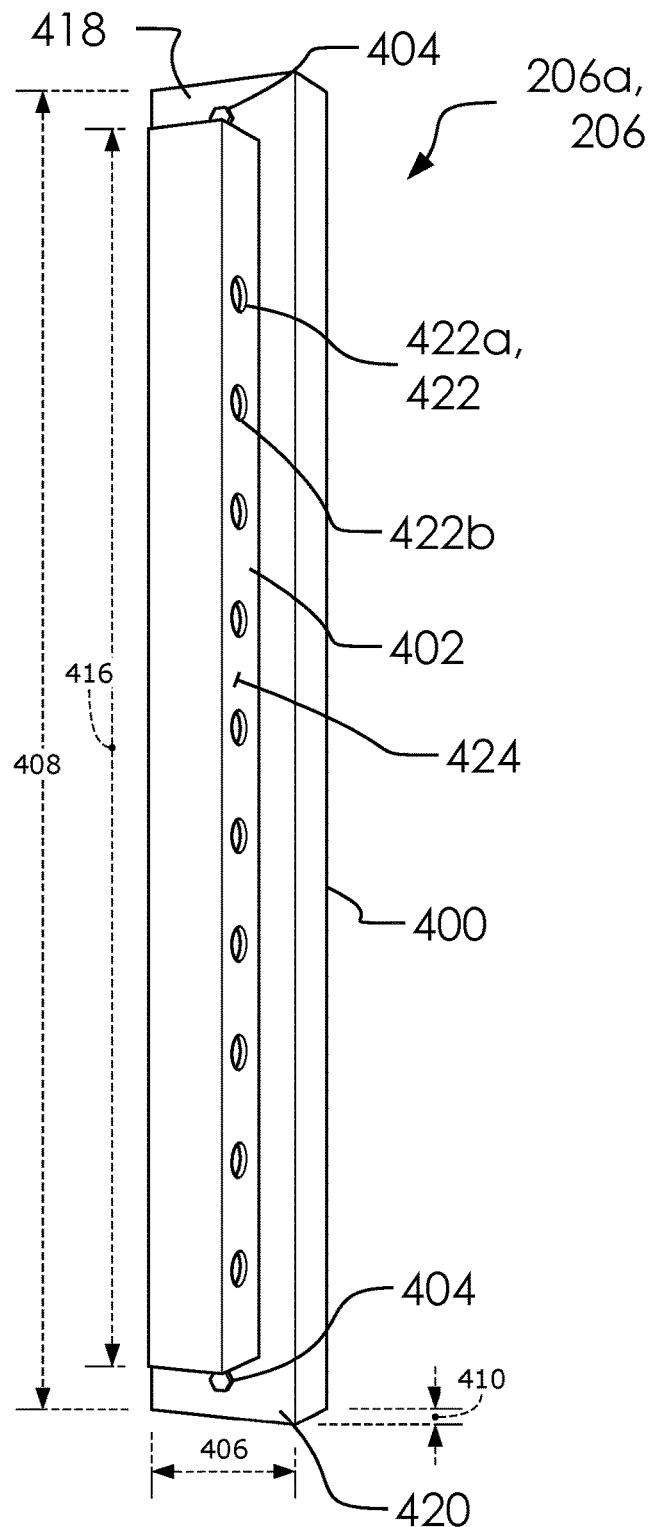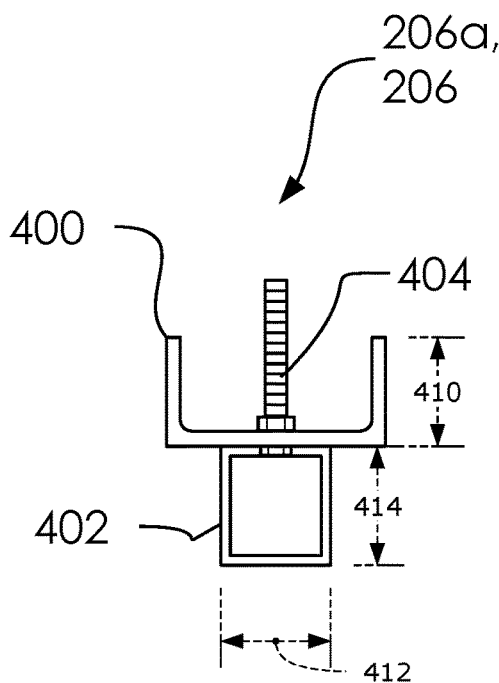
FIG. 4B
FIG. 4A

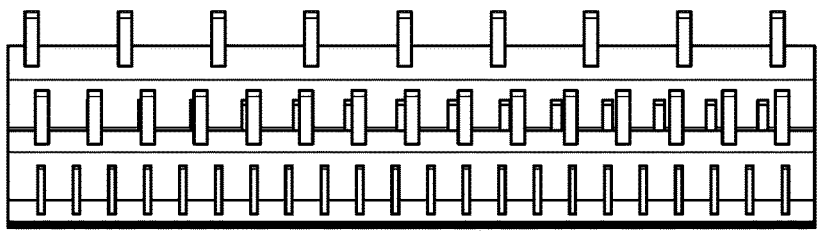 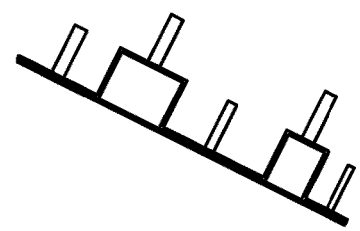
FIG. 10A    FIG. 10B
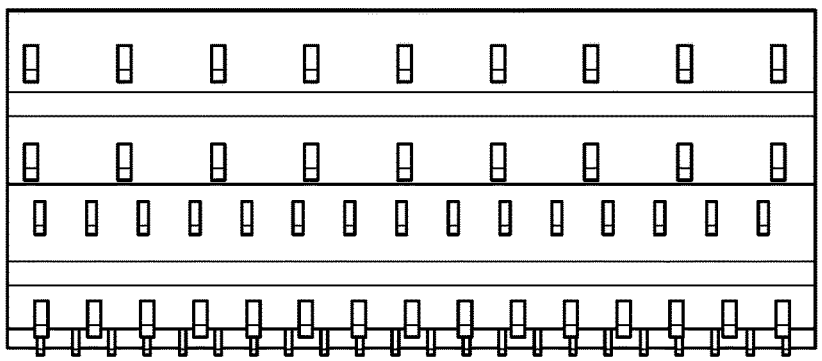
FIG. 10C
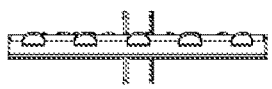   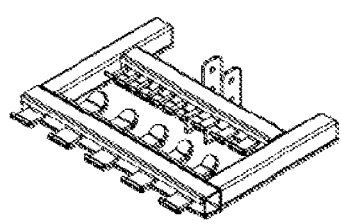
FIG. 10D    FIG. 10E
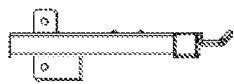   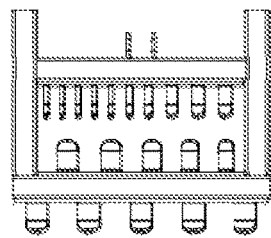
FIG. 10F    FIG. 10G

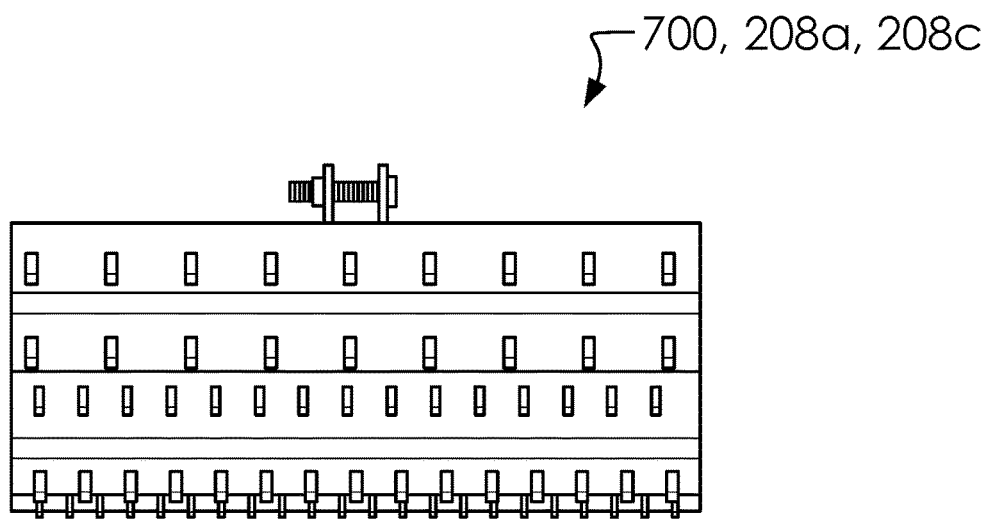
FIG. 11A
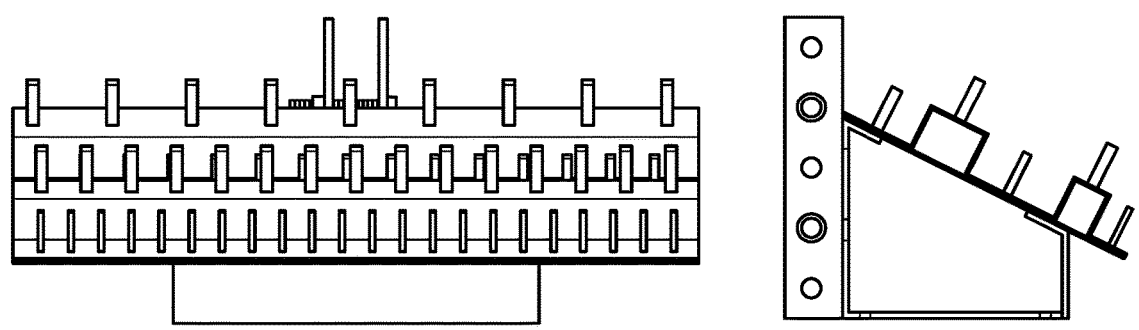 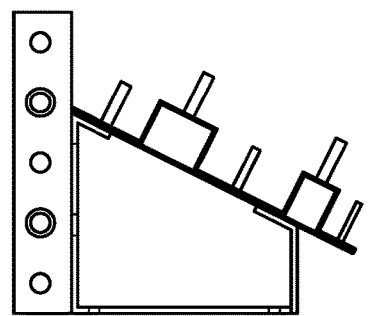
FIG. 11B  FIG. 11C

1802

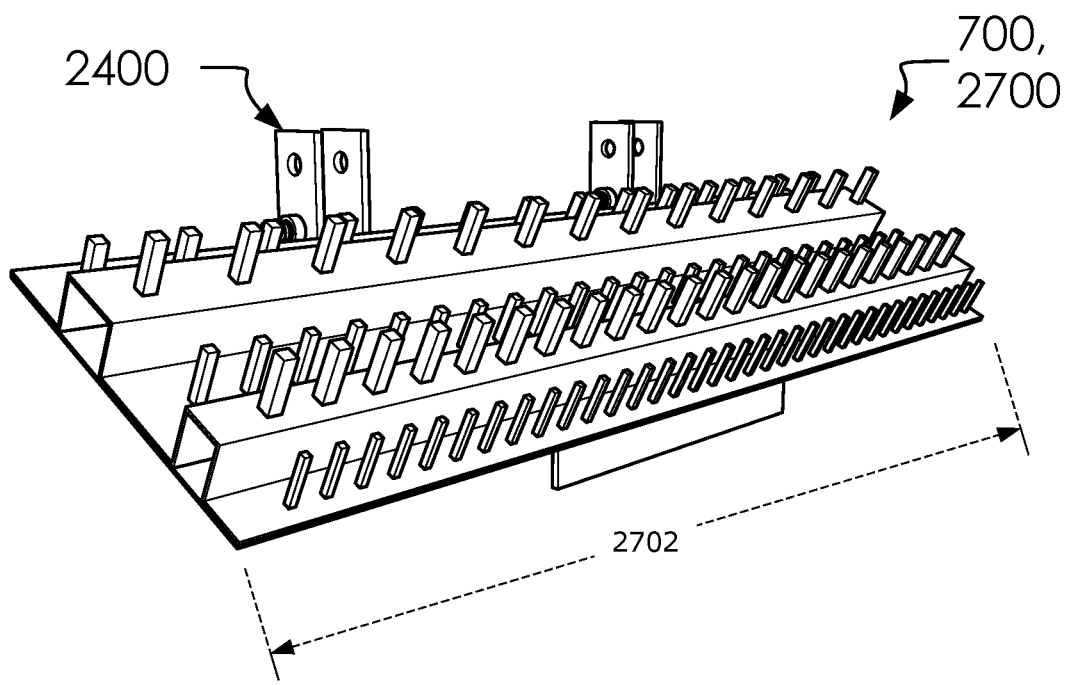
FIG. 27A
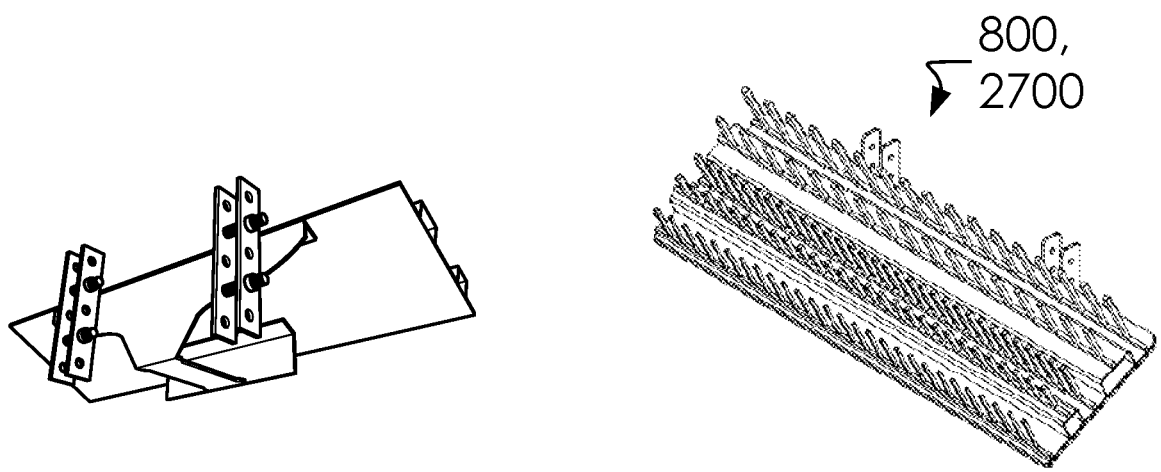
FIG. 27B
FIG. 27C

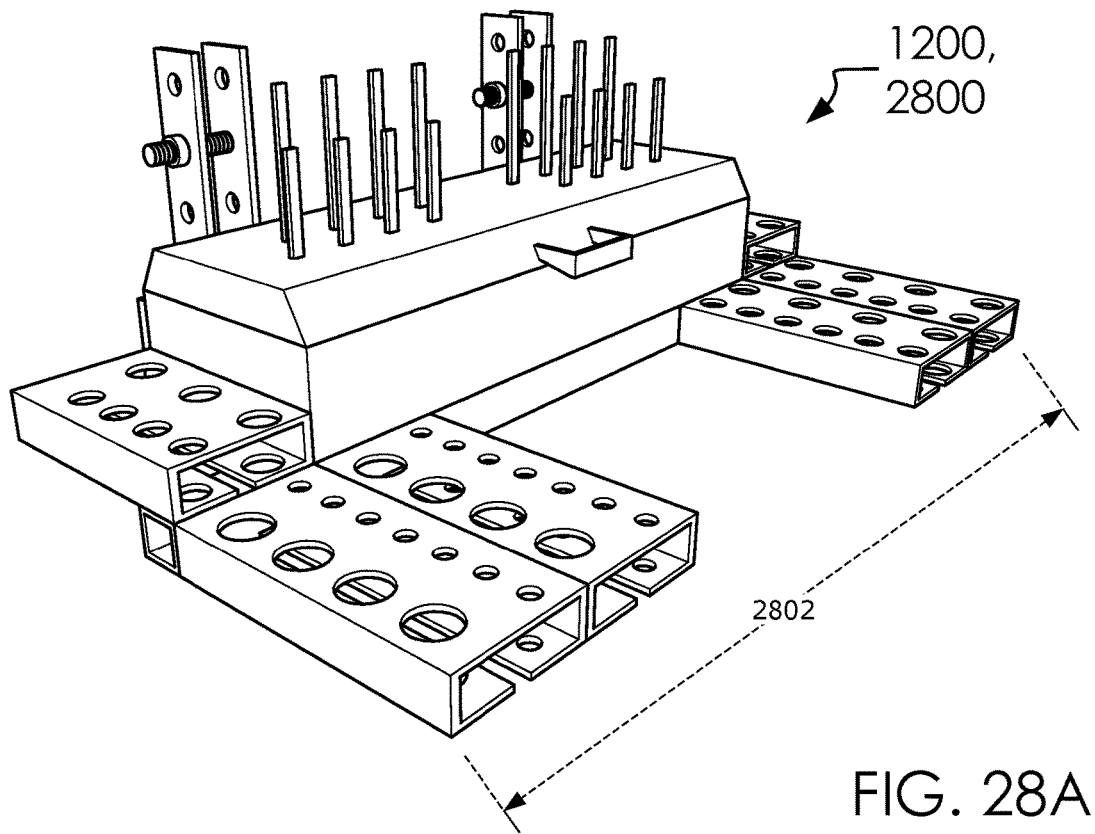
FIG. 28A
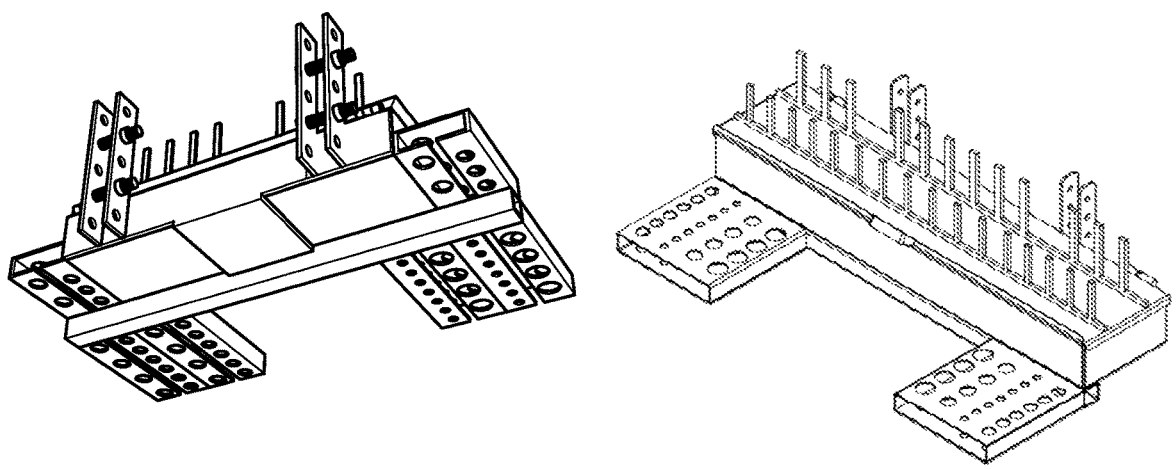
FIG. 28B
FIG. 28C

TOOLBOX

CROSS-REFERENCE TO RELATED APPLICATIONS

This application claims benefit to U.S. patent application No. 63/008,433 filed on 2020 Apr. 10.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Although not seen to anticipate the current system, examples of toolbox organizer systems known to the Applicant include: U.S. Pat. No. 6,619,772B2, U.S. Pat. No. 6,113,202A, 6,578,937B1, US20170057425A1, US20170182653A1, U.S. Pat. Nos. 5,740,883A, 9,914,209, and 5,125,518A.

As discussed below a toolbox accessory system 100 can have many advantages. One example comprises an arrangement of rails and accessory assemblies configured to maximize space utilization, versatility and safety within a utility box 104a on a truck 102.

BRIEF SUMMARY OF THE INVENTION

A toolbox accessory system for organizing and utilizing a utility box of a truck. Said toolbox accessory system comprises one or more rail assemblies attached to one or more back walls of said utility box. Said toolbox accessory system comprises one or more accessory assemblies configured to selectively attach to said one or more rail assemblies. Said one or more accessory assemblies are configured to selectively store tools within one or more utility boxes. Said one or more accessory assemblies are attached in a vertical configuration along said one or more back walls of said one or more utility boxes. A box shell comprises said one or more back walls, a top portion, a bottom portion, two side walls, and a front opening. Said one or more rail assemblies are arranged between said top portion and said bottom portion in a vertical configuration.

Said toolbox accessory system for organizing and utilizing said utility box of said truck. Said toolbox accessory system comprises said one or more rail assemblies attached to said one or more back walls of said utility box. Said toolbox accessory system comprises said one or more accessory assemblies configured to selectively attach to said one or more rail assemblies. Said one or more accessory assemblies are configured to selectively store tools within said one or more utility boxes. Said one or more accessory assemblies are attached in a vertical configuration along said one or more back walls of said one or more utility boxes. Said box shell comprises said one or more back walls, said top portion, said bottom portion, said two side walls, and said front opening. Said one or more rail assemblies are arranged between said top portion and said bottom portion in said vertical configuration. Said one or more back walls comprises a lower backwall and an upper backwall. Said lower backwall is set back a first depth and said upper backwall is set back a second depth. Said one or more back walls comprises a plurality of planar surfaces, as opposed to a single planar surface. Said one or more rail assemblies comprises a first rail assembly and a second rail assembly. Said first rail assembly attaches to said upper backwall and said second rail assembly is configured to attach to said lower backwall. Said one or more rail assemblies comprises at least a mounting rail. Said mounting rail comprises a width and a depth and a length. Said mounting rail is configured selectively attach to a portion of said one or more back walls and selectively receive and hold said one or more accessory assemblies. Said mounting rail comprises a side portion having one or more apertures. Said one or more apertures comprise at least a first aperture, and a second aperture. Said one or more accessory assemblies are configured to attach to said one or more apertures. each among said one or more accessory assemblies comprise a sliding bracket. Said sliding bracket is configured to selectively attach said one or more accessory assemblies to said one or more rail assemblies. Said sliding bracket comprises a first plate and a second plate arranged parallel to one another with one or more apertures for receiving and holding one or more fasteners. Said sliding bracket is configured to attach to said one or more rail assemblies by arranging said first plate and said second plate on either side of said mounting rail, and sliding a portion of said one or more fasteners through said one or more apertures in said first plate, a portion of said one or more apertures of said mounting rail, and said one or more apertures in said second plate.

Said toolbox accessory system for organizing and utilizing said utility box of said truck. Said toolbox accessory system comprises said one or more rail assemblies attached to said one or more back walls of said utility box. Said toolbox accessory system comprises said one or more accessory assemblies configured to selectively attach to said one or more rail assemblies. Said one or more accessory assemblies are configured to selectively store tools within said one or more utility boxes. Said one or more accessory assemblies are attached in a vertical configuration along said one or more back walls of said one or more utility boxes. Said box shell comprises said one or more back walls, said top portion, said bottom portion, said two side walls, and said front opening. Said one or more rail assemblies are arranged between said top portion and said bottom portion in said vertical configuration. Said toolbox accessory system comprises a wide configuration. Said wide configuration comprises said one or more accessory assemblies with wide configurations. A pegged tool holder assembly and a toolbox accessory assembly comprises two sliding brackets and a greater width for said wide configuration. Likewise, said one or more rail assemblies comprises a two parallel rails aligned on said one or more back walls for holding said one or more accessory assemblies. Said two parallel rails is split similar to said first rail assembly and said second rail assembly attached to said lower backwall and said upper backwall. Said two parallel rails comprises one or more sets of rails. Said one or more sets of rails comprises a first set of rails, and a second set of rails. each of said one or more sets of rails comprises a first rail and a second rail, arranged in parallel and with one or more support bars arranged between one another. Said one or more rail assemblies comprises at least said mounting rail. Said mounting rail comprises said width and said depth and said length. Said mounting rail is configured selectively attach to a portion of said one or more back walls and selectively receive and hold said one or more accessory assemblies. Said mounting rail comprises said side portion having said one or more apertures. Said one or more apertures comprise at least said first aperture, and said second aperture. Said one or more accessory assemblies are configured to attach to said one or more apertures. Said one or more rail assemblies comprises a backing portion, and one or more fasteners. Said backing portion comprises a width, a length, and a depth. Said backing portion is attached to said mounting rail by welding the two parts together. Said one or more rail assemblies are configured to selectively attach to portions of said one or more back walls by attaching said mounting rail to said backing portion, and selectively attaching said backing portion to said one or more back walls with said one or more fasteners.

BRIEF DESCRIPTION OF THE SEVERAL VIEWS OF THE DRAWING

FIGS. 4A and 4B illustrate a perspective overview and an elevated top view of a first rail assembly 206*a*.

FIGS. 10A, 10B and 10C illustrate an elevated frontside, first side, and top side view of a peg board 706.

FIGS. 10D, 10E, 10F, and 10G illustrate an elevated frontside, perspective overview, elevated first side, and top side view of a tabbed accessory assembly 1000.

FIGS. 11A, 11B and 11C illustrate an elevated frontside, first side, and top side view of said pegged tool holder assembly 700.

FIGS. 27A, 27B, and 27C illustrate a perspective overview and lower back side view of said pegged tool holder assembly 700 and said pegged tool holder assembly 800 in a wide configuration 2700.

FIGS. 28A, 28B, and 28C illustrate a perspective overview, lower back side view, and a perspective overview of said toolbox accessory assembly 1200 in a wide configuration 2800.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
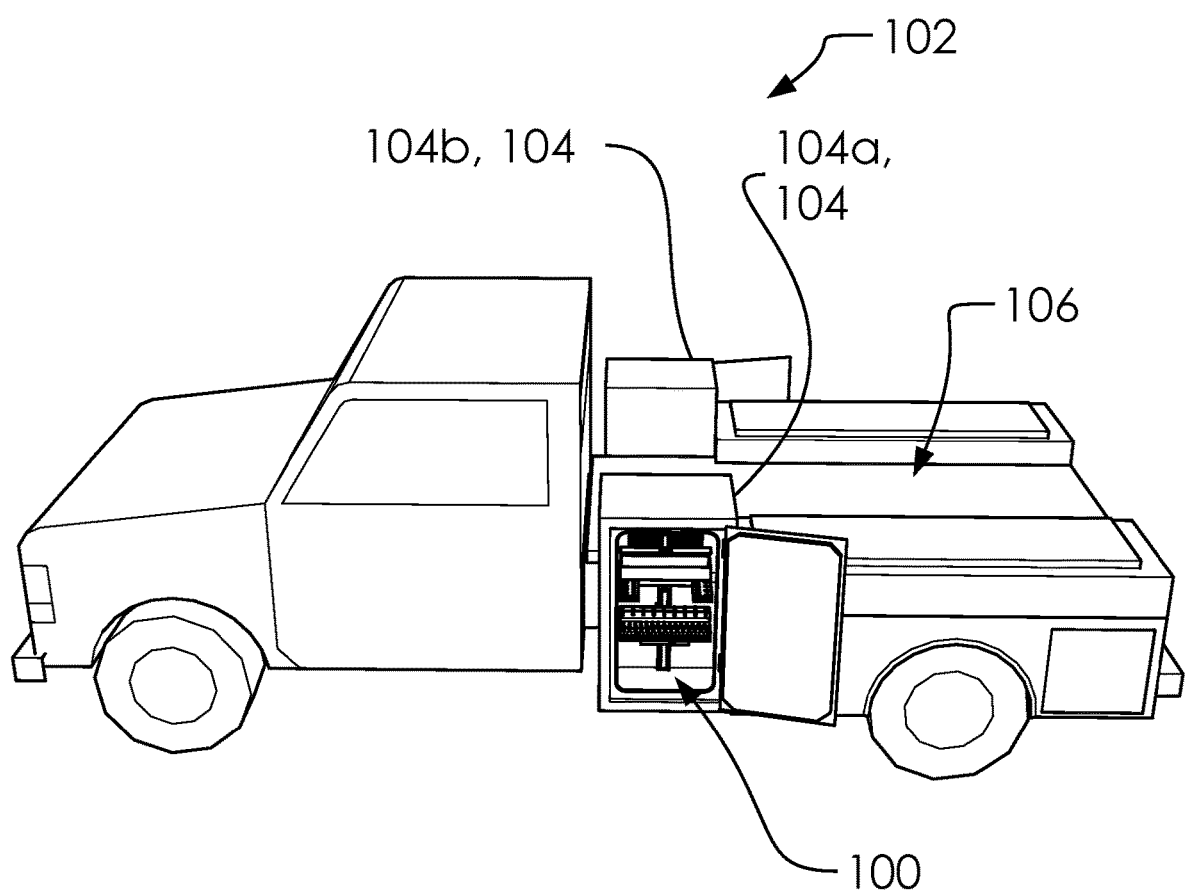
FIG. 1 illustrates a perspective overview of a toolbox accessory system 100 mounted on a truck 102.

FIG. 1 illustrates a perspective overview of a toolbox accessory system 100 mounted on a truck 102.

In one embodiment, said truck 102 can comprise one or more utility boxes 104 (which can comprise a utility box 104*a*, and a second utility box 104*b*).

In one embodiment, said toolbox accessory system 100 can organize said one or more utility boxes 104.

Said truck 102 can comprise a flat floor 106 at a rear portion of said truck 102. In one embodiment, said one or more utility boxes 104 can attach to a side portion of said flat floor 106.

In one embodiment, said truck 102 can comprise a flatbed truck, as is known in the art.

Figure 2:
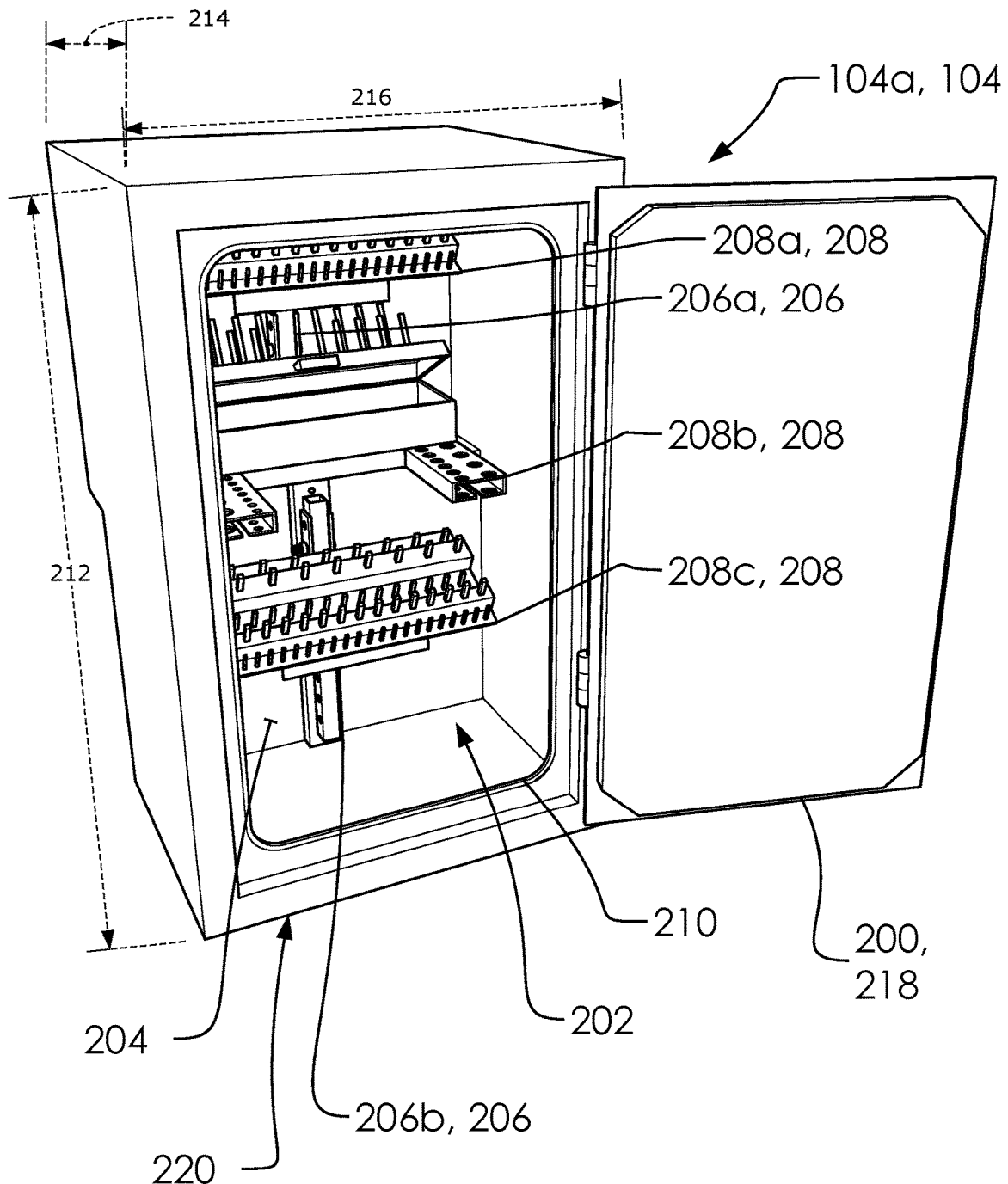
FIG. 2 illustrates a perspective overview of a utility box 104*a*, with a door 200, in an open configuration 218.

FIG. 2 illustrates a perspective overview of said utility box 104a, with a door 200, in an open configuration 218.

In one embodiment, said one or more utility boxes 104 can comprise a compartment 202, a box shell 220, one or more back walls 204, a front opening 210, a height 212, a depth 214, and a width 216. In one embodiment said one or more back walls 204 can comprise one or more interior walls of said one or more utility boxes.

In one embodiment, said toolbox accessory system 100 can selectively mount one or more accessory assemblies 208 (which can comprise a first accessory assembly 208a, a second accessory assembly 208b, and a third accessory assembly 208c) on one or more rail assemblies 206 (which can comprise a first rail assembly 206a, and a second rail assembly 206b).

In one embodiment, said utility box 104a can comprise said door 200 and said box shell 220 substantially enclosing said compartment 202.

Figure 3:
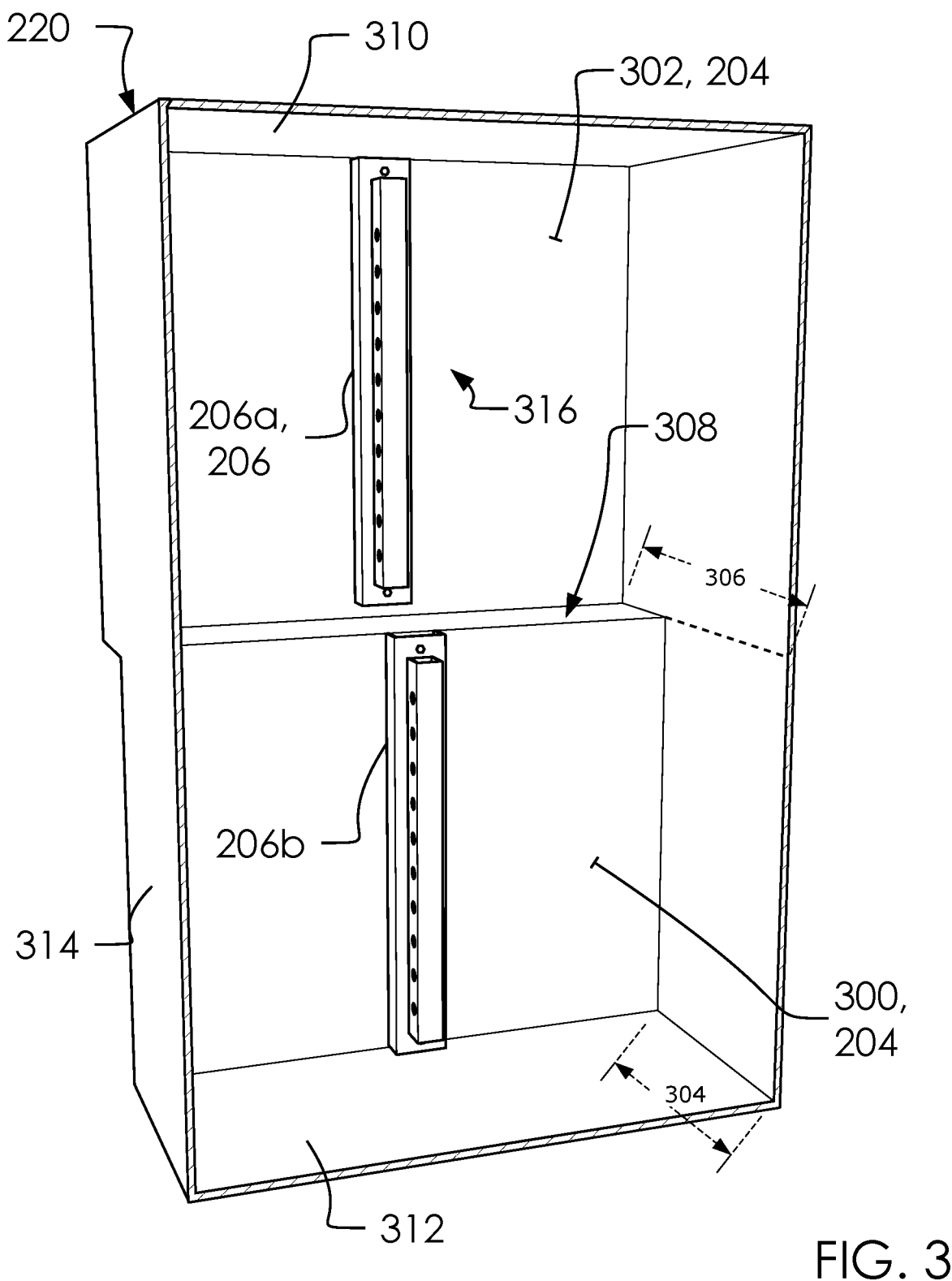
FIG. 3 illustrates a perspective cross-section view of said utility box 104*a* with one or more rail assemblies 206 mounted on one or more back walls 204.

FIG. 3 illustrates a perspective cross-section view of said utility box 104a with said one or more rail assemblies 206 mounted on said one or more back walls 204.

In one embodiment, said one or more back walls 204 can comprise a lower backwall 300 and an upper backwall 302, as illustrated. In one embodiment, said lower backwall 300 can be set back a first depth 304 and said upper backwall 302 can be set back a second depth 306.

In one embodiment, said one or more back walls 204 can comprise a plurality of planar surfaces, as opposed to a single planar surface, as a consequence of constructing said box shell 220 to fit on said truck 102. For example, as illustrated in FIG. 1, said one or more utility boxes 104 can attach to a side portion of said flat floor 106, and a horizontal shelf 308 between said one or more back walls 204 can be sit substantially on and attach to said flat floor 106. Accordingly, where said one or more back walls 204 comprise said lower backwall 300 and said upper backwall 302, said one or more rail assemblies 206 can comprise said first rail assembly 206a and said second rail assembly 206b; wherein, said first rail assembly 206a can attach to said upper backwall 302 and said second rail assembly 206b can attach to said lower backwall 300.

Said box shell 220 can comprise said one or more back walls 204, a top portion 310, a bottom portion 312, two side walls 314, and said front opening 210.

Said one or more rail assemblies 206 can be arranged between said top portion 310 and said bottom portion 312 in a vertical configuration 316.

FIGS. 4A and 4B illustrate a perspective overview and an elevated top view of said first rail assembly 206a.

In one embodiment, said one or more rail assemblies 206 can comprise a mounting rail 402, and one or more fasteners 404. Said mounting rail 402 can comprise a width 412 and a depth 414, which can comprise 1" by 1", and a length 416. In one embodiment, said mounting rail 402 can be configured selectively attach to a portion of said one or more back walls 204 and selectively receive and hold said one or more accessory assemblies 208.

In one embodiment, said one or more rail assemblies 206 can comprise a backing portion 400. Said backing portion 400 can comprise a u-shaped bracket having a width 406, a length 408, and a depth 410. In one embodiment, said backing portion 400 can be attached to said mounting rail 402 by welding the two parts together. Accordingly, said mounting rail 402 can selectively attach to portions of said one or more back walls 204 by attaching said mounting rail 402 to said backing portion 400, and selectively attaching said backing portion 400 to said one or more back walls 204 with said one or more fasteners 404, as illustrated.

In one embodiment, said length 416 of said mounting rail 402 can be shorter than said length 408 of said backing portion 400, leaving space on said backing portion 400 to have said one or more fasteners 404 at a first end 418 and a second end 420 of said backing portion 400, as illustrated.

In one embodiment, said mounting rail 402 can comprise one or more apertures 422 (which can comprise a first aperture 422a, and a second aperture 422b) on a side portion 424 of said mounting rail 402.

Figure 5A:
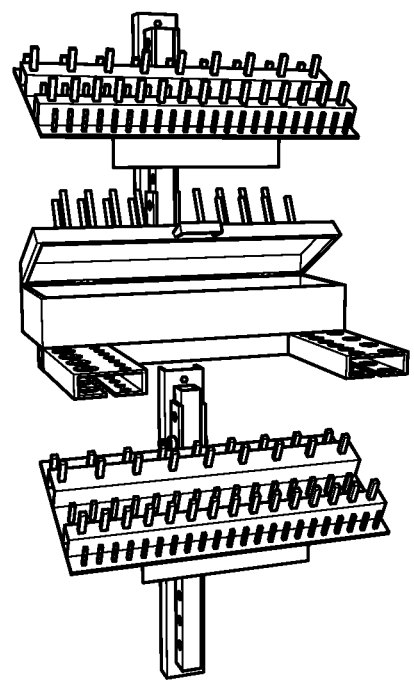
FIGS. 5A, 5B, and 5C illustrate a perspective overview of said one or more rail assemblies 206 with one or more accessory assemblies 208.
Figure 5B:
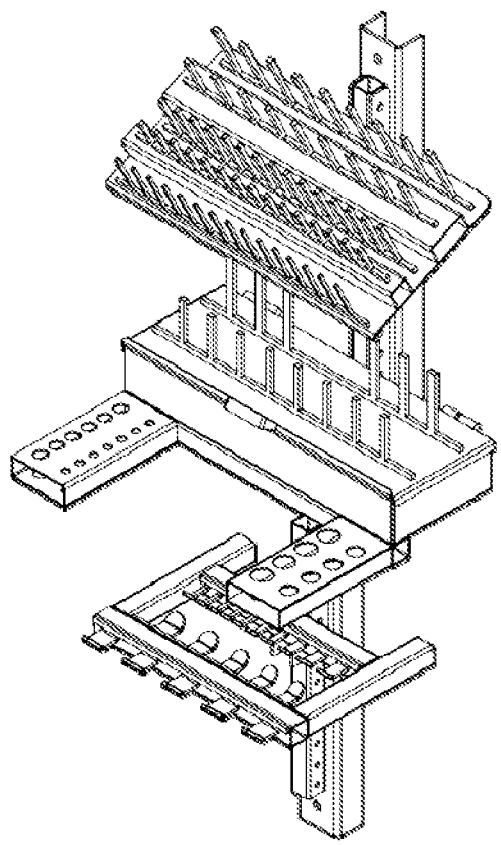
Figure 5C:
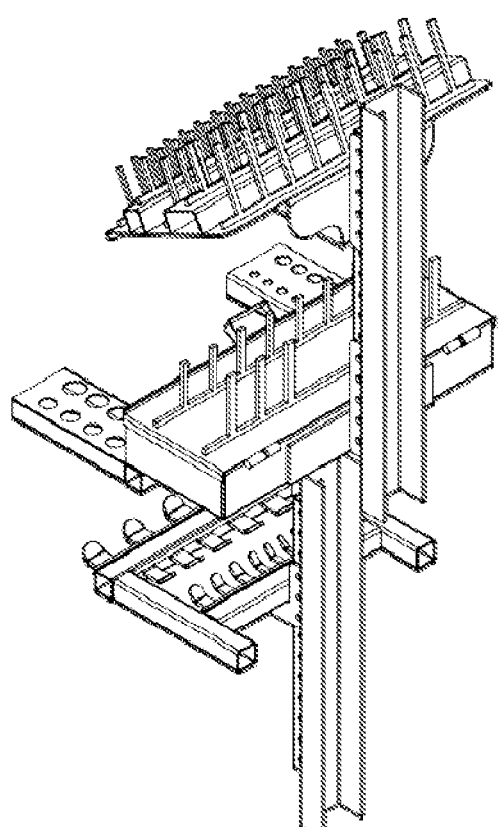

FIGS. 5A, 5B, and 5C illustrate a perspective overview of said one or more rail assemblies 206 with said one or more accessory assemblies 208.

In one embodiment, said one or more accessory assemblies 208 can selectively attach to said one or more rail assemblies 206 for arrangement and access within said one or more utility boxes 104.

Figure 6:
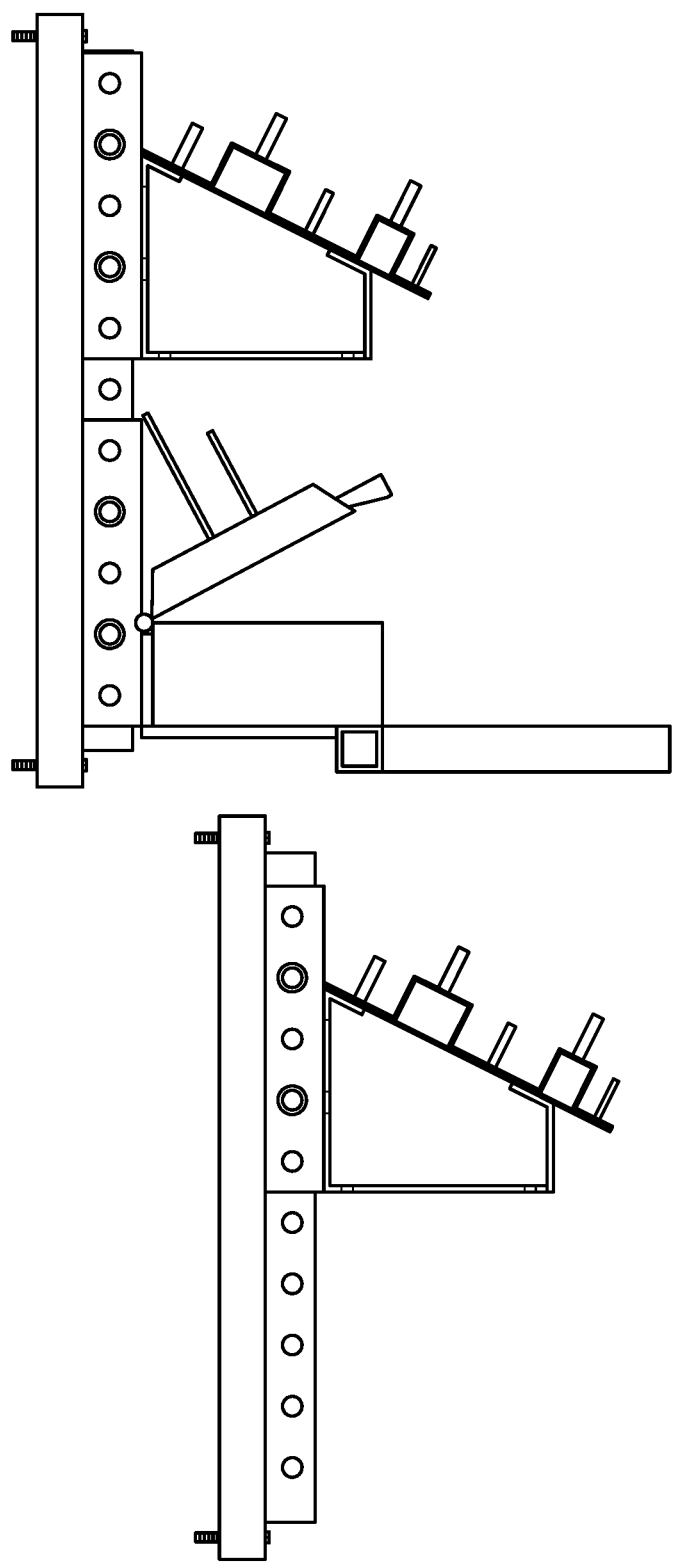
FIG. 6 illustrates an elevated side view of said one or more rail assemblies 206 with said one or more accessory assemblies 208.

FIG. 6 illustrates an elevated side view of said one or more rail assemblies 206 with said one or more accessory assemblies 208.

As here, said one or more rail assemblies 206 can be split to attach to said lower backwall 300 and said upper backwall 302; wherein, said one or more accessory assemblies 208 can be attached to either of said one or more rail assemblies 206, rather than in one stack.

Figure 7A:
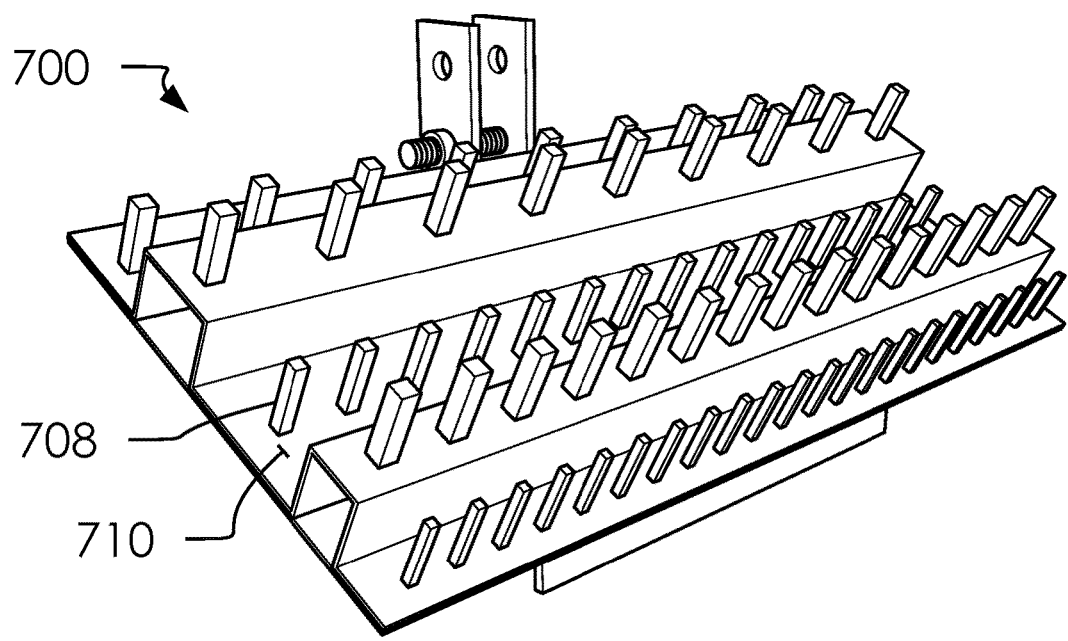
FIGS. 7A and 7B illustrate a perspective overview and lower side view of a pegged tool holder assembly 700.
Figure 7B:
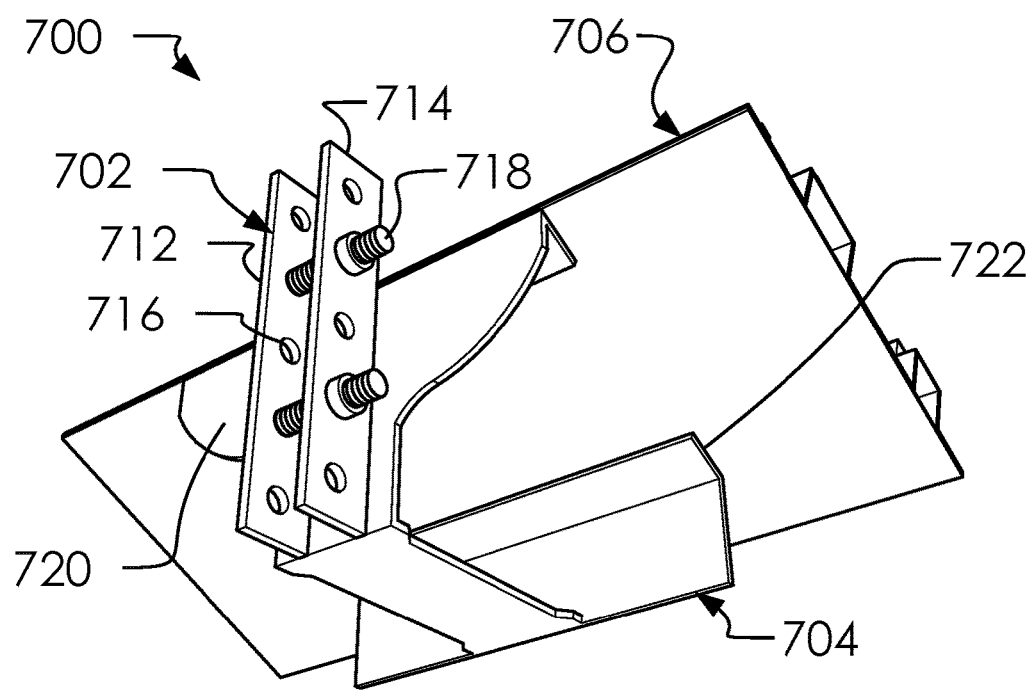

FIGS. 7A and 7B illustrate a perspective overview and lower side view of a pegged tool holder assembly 700.

In one embodiment, each among said one or more accessory assemblies 208 can comprise a sliding bracket 702.

In one embodiment, each among said one or more accessory assemblies 208 can comprise a support bracket 704. Said sliding bracket 702 can selectively attach to said one or more rail assemblies 206, and said support bracket 704 can attach to said sliding bracket 702. In one embodiment, said support bracket 704 can extend horizontally out from said sliding bracket 702 and support an accessory portion 802 of said one or more accessory assemblies 208. In one embodiment, said accessory portion 802 can comprise useful parts of said one or more accessory assemblies 208 for organizing tools or objects within said one or more utility boxes 104, such as plurality of pegs 708.

In one embodiment, a portion of said one or more accessory assemblies 208 can comprise said pegged tool holder assembly 700. For example, both said first accessory assembly 208a and said third accessory assembly 208c can comprise said pegged tool holder assembly 700. Said pegged tool holder assembly 700 can comprise said sliding bracket 702, said support bracket 704 and a peg board 706. Said peg board 706 can comprise said plurality of pegs 708 arranged on one or more raised planes 710.

Said sliding bracket 702 can comprise a first plate 712 and a second plate 714 arranged parallel to one another with one or more apertures 716 for receiving and holding one or more fasteners 718.

Said sliding bracket 702 can attach to a backside 720 of said support bracket 704, and said peg board 706 can attach to a top face 722 of said support bracket 704. In one embodiment, said sliding bracket 702 is attached to said support bracket 704 by welding. In one embodiment, said peg board 706 is attached to said support bracket 704 by one or more fasteners 724, as illustrated, or by welding.

In one embodiment, said sliding bracket 702 can attach to said one or more rail assemblies 206 by arranging said first plate 712 and said second plate 714 on either side of said mounting rail 402, and sliding a portion of said one or more fasteners 718 through said one or more apertures 716 in said first plate 712, a portion of said one or more apertures 422 of said mounting rail 402, and said one or more apertures 716 in said second plate 714.

Figures 8A, 8B:
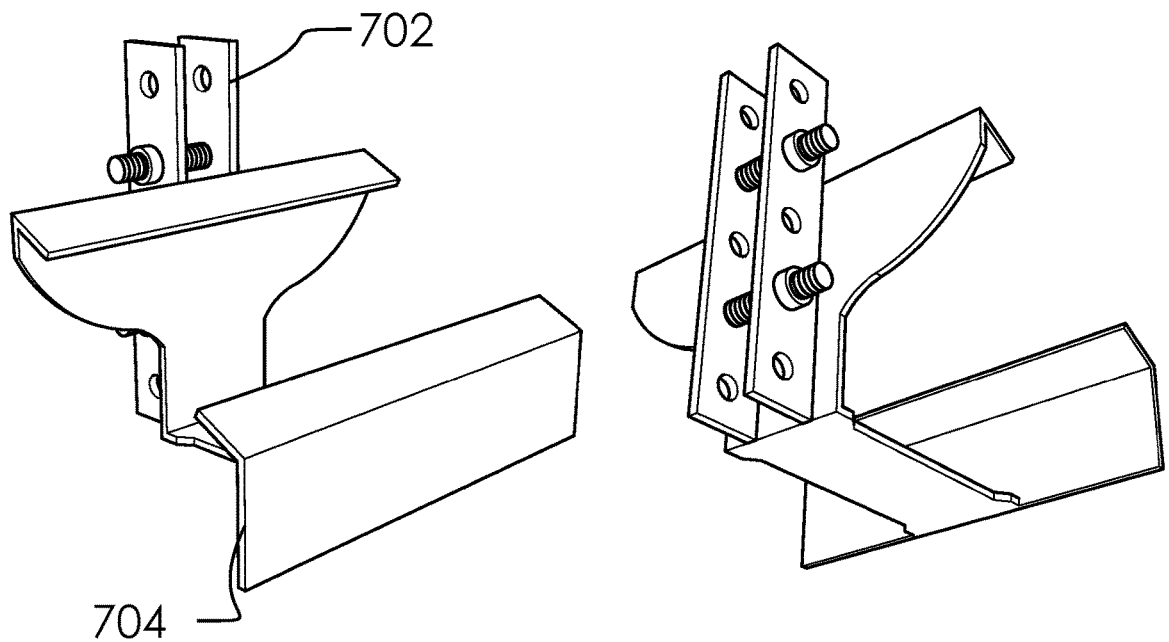
FIGS. 8A and 8B illustrate a perspective overview and lower side view of a sliding bracket 702 and a support bracket 704.

FIGS. 8A and 8B illustrate a perspective overview and lower side view of said sliding bracket 702 and said support bracket 704.

Figure 8C:
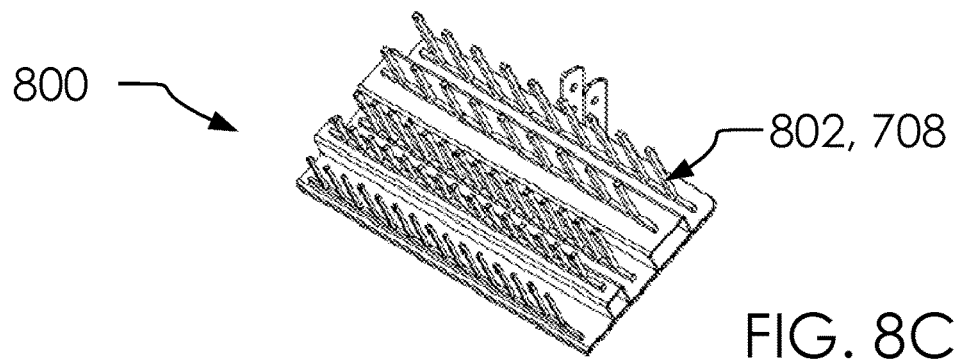
FIGS. 8C and 8D illustrate a perspective overview and top side view a pegged tool holder assembly 800.
Figure 8D:
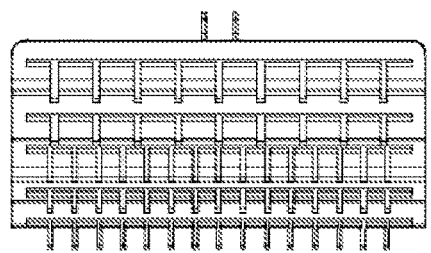
Figure 9A:
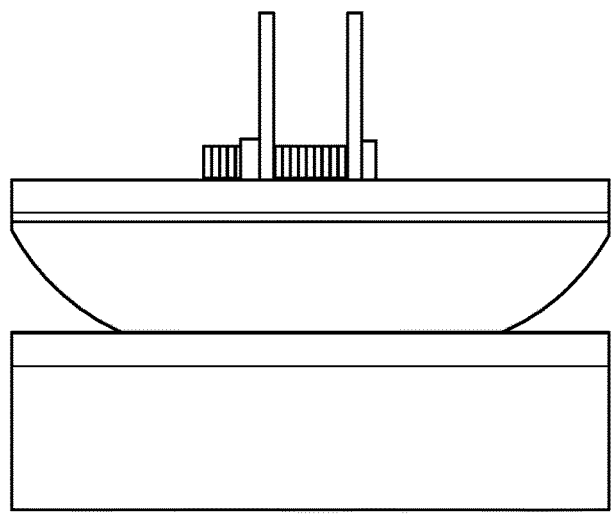
FIGS. 9A, 9B, 9C, and 9D illustrate an elevated frontside, first side, top side and first sideview of said sliding bracket 702 and said support bracket 704.
Figure 9B:
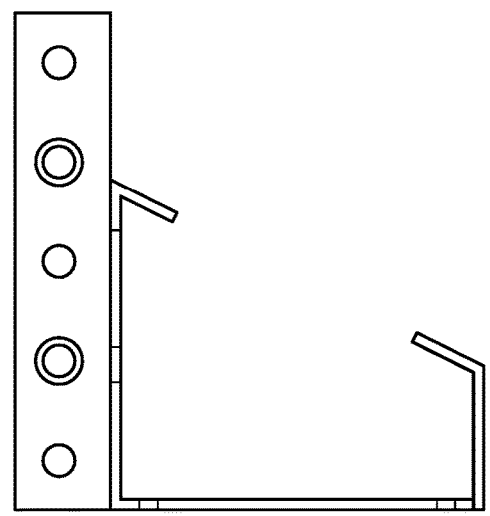
Figure 9C:
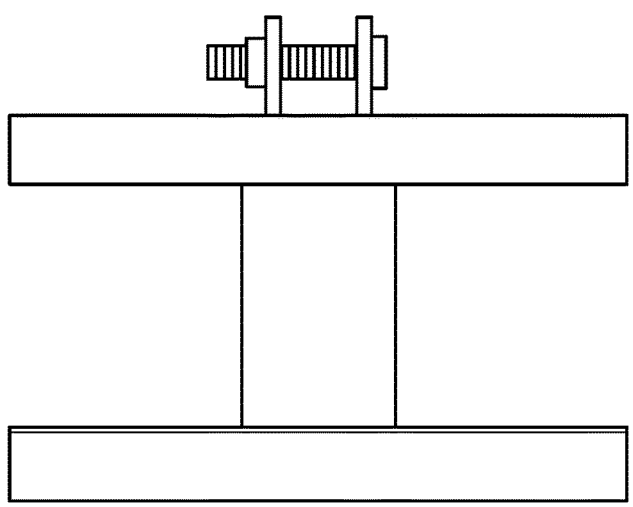
Figure 9D:
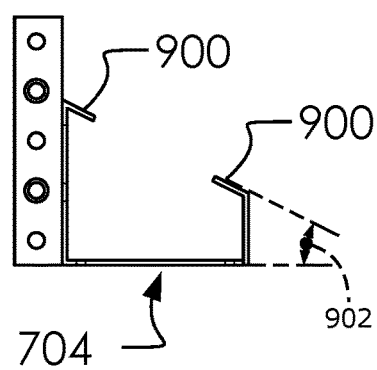

FIGS. 8C and 8D illustrate a perspective overview and top side view a pegged tool holder assembly 800.

In one embodiment, said pegged tool holder assembly 800 and said pegged tool holder assembly 700 can be substantially similar but for the arrangement of said plurality of pegs 708, as illustrated.

FIGS. 9A, 9B, 9C, and 9D illustrate an elevated frontside, first side, top side and first view sideview of said sliding bracket 702 and said support bracket 704.

In one embodiment, said support bracket 704 can comprise a mounting surface 900. In one embodiment, said mounting surface 900 can comprise a sloped face at a slope angle 902 so as to present said accessory portion 802 for visual inspection to the end user, as is known in the art.

In one embodiment, said mounting surface 900 can comprise one or more top surfaces of said support bracket 704. For example, as illustrated, said mounting surface 900 has a break.

FIGS. 10A, 10B and 10C illustrate an elevated frontside, first side, and top side view of said peg board 706.

FIGS. 10D, 10E, 10F, and 10G illustrate an elevated frontside, perspective overview, elevated first side, and top side view of a tabbed accessory assembly 1000.

FIGS. 11A, 11B and 11C illustrate an elevated frontside, first side, and top side view of said pegged tool holder assembly 700.

Figure 12A:
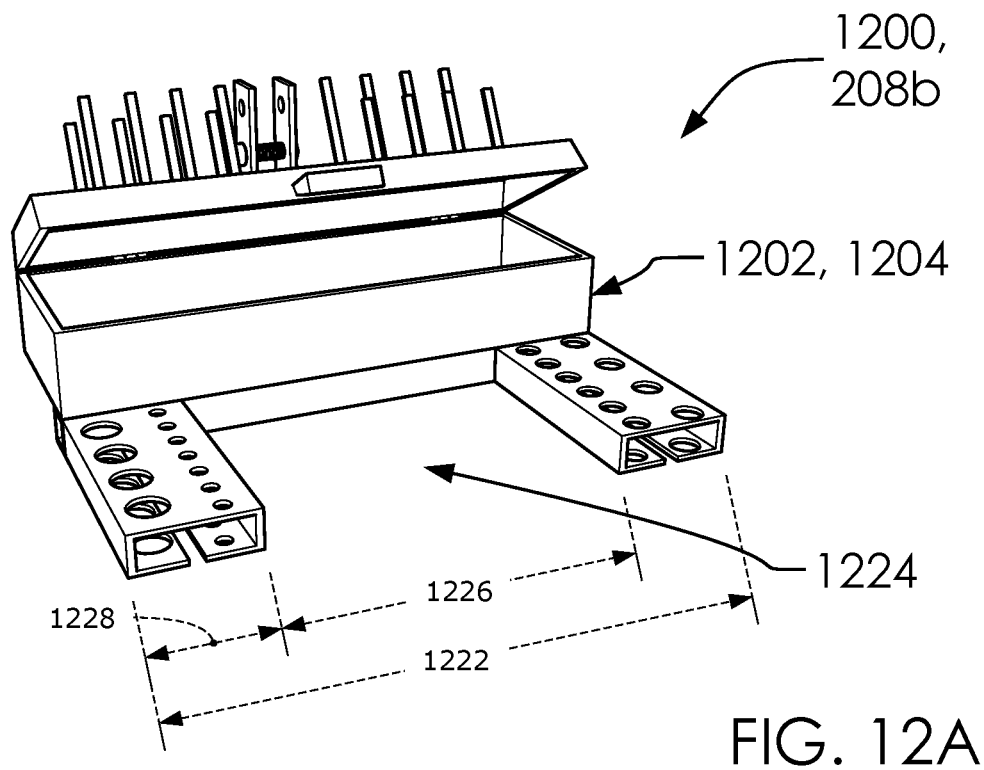
FIGS. 12A and 12B illustrate a perspective overview of a toolbox accessory assembly 1200.
Figure 12B:
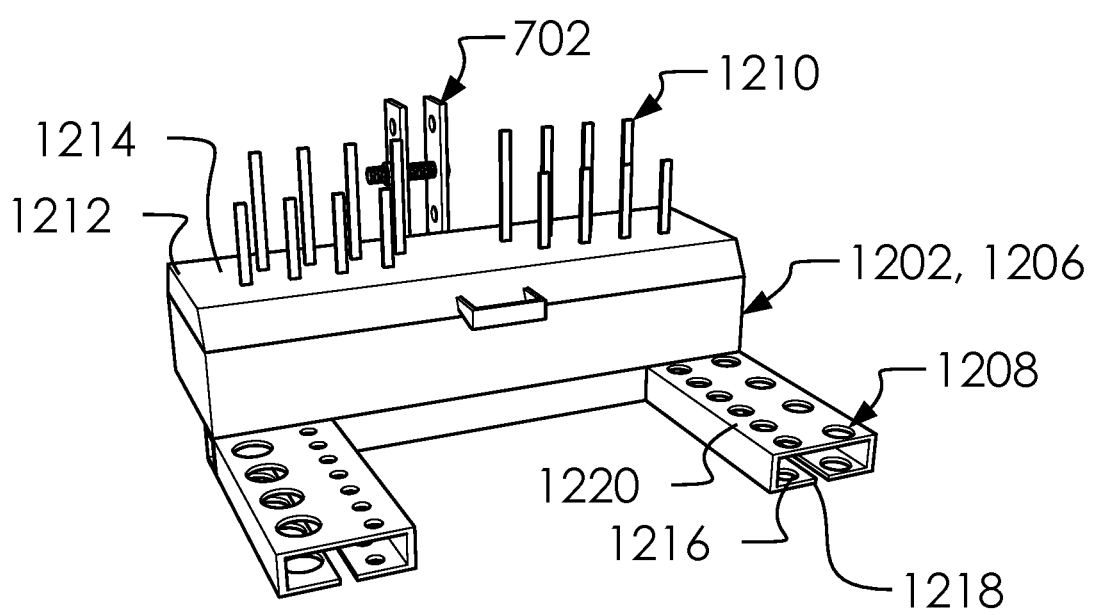

FIGS. 12A and 12B illustrate a perspective overview of a toolbox accessory assembly 1200.

Said toolbox accessory assembly 1200 can comprise a box 1202, one or more slotted plates 1208, and said sliding bracket 702. In one embodiment, said box 1202 can comprise a plurality of pegs 1210 with a hinged lid 1212. Said plurality of pegs 1210 can be arranged on a top surface 1214 of said hinged lid 1212.

Said box 1202 can comprise an open configuration 1204 and a closed configuration 1206

Said one or more slotted plates 1208 can comprise a plurality of slots 1216 arranged and aligned on a bottom plane 1218 and a top plane 1220, as illustrated.

Said toolbox accessory assembly 1200 can comprise a width 1222, a gap 1224 between said one or more slotted plates 1208 can comprise a gap width 1226, and each of said one or more slotted plates 1208 can comprise a width 1228.

Figure 13A:
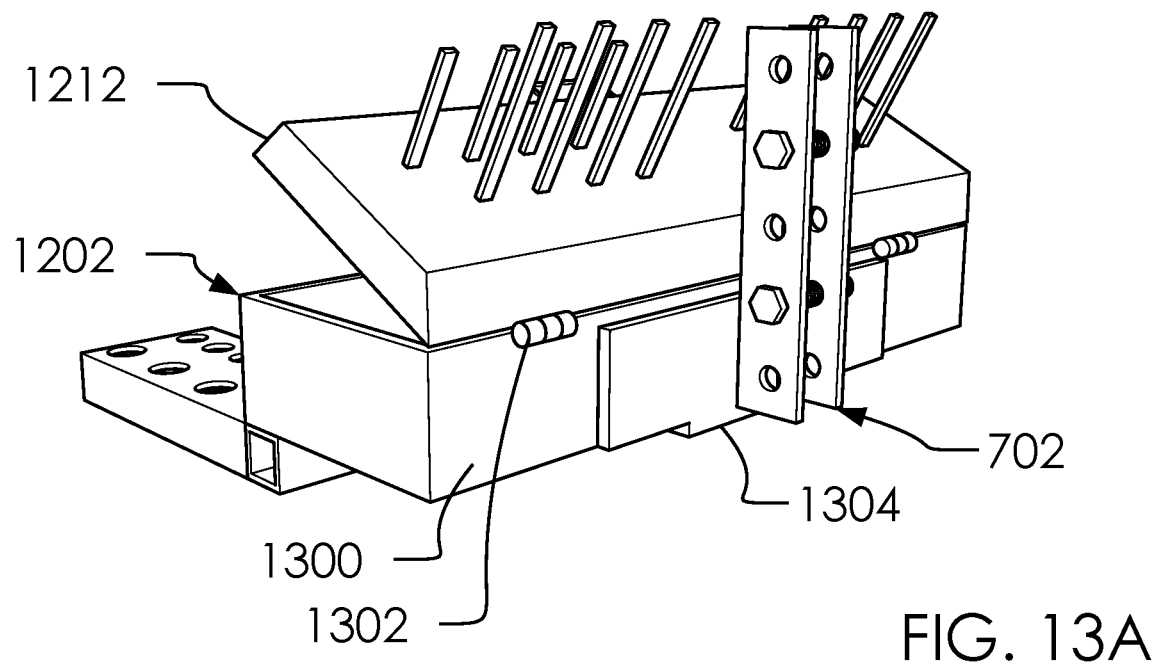
FIGS. 13A, 13B, and 13C illustrate two perspective rear views and a perspective overview of said toolbox accessory assembly 1200 with a box 1202 in an open configuration 1204 and a closed configuration 1206.
Figure 13B:
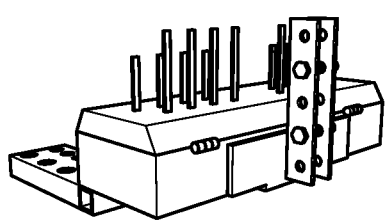
Figure 13C:
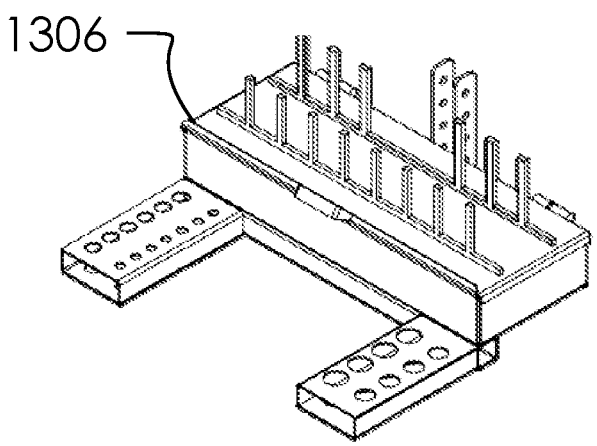

FIGS. 13A, 13B, and 13C illustrate two perspective rear views and a perspective overview of said toolbox accessory assembly 1200 with said box 1202 in said open configuration 1204 and said closed configuration 1206.

Said box 1202 can comprise a lower portion 1300 being attached to said hinged lid 1212 with a hinge 1302. In one embodiment, said hinge 1302 can comprise two hinges, as illustrated.

In one embodiment, said toolbox accessory assembly 1200 can comprise a support bracket 1304. Said support bracket 1304 can attach to said sliding bracket 702 and said box 1202.

As shown in FIG. 13C, said box 1202 can comprise a modified box with a substantially more squared configuration of said hinged lid 1212.

In the case of said toolbox accessory assembly 1200, said support bracket 704 can comprise said lower portion 1300, as illustrated.

In one embodiment, said hinged lid 1212 can comprise a front lip 1306, as illustrated. Said front lip 1306 can flip up so as to create a barrier which can prevent small items from inadvertently rolling off the front edge of said hinged lid 1212.

Figure 14:
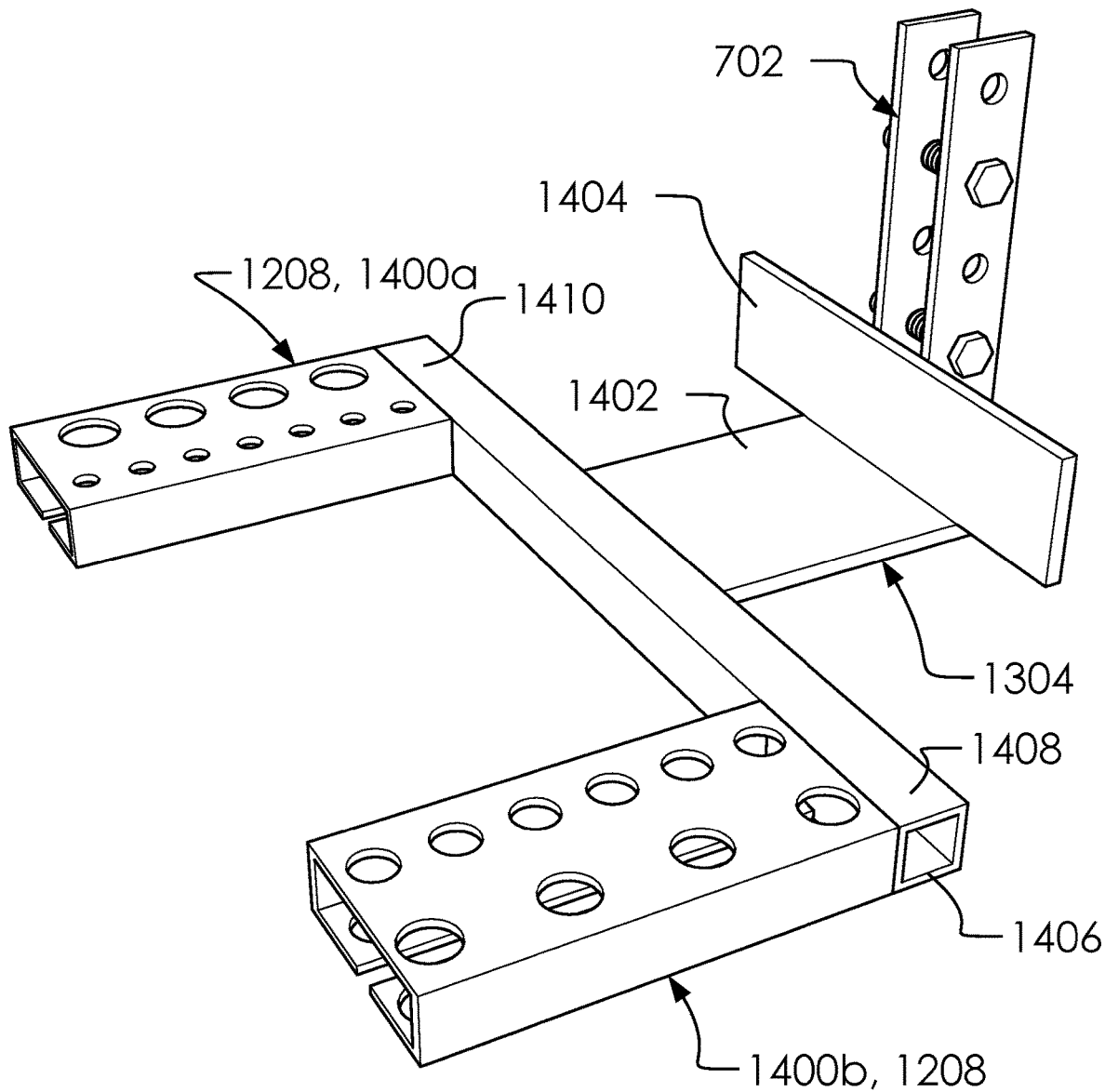
FIG. 14 illustrates a perspective overview of said sliding bracket 702, a support bracket 1304 and one or more slotted plates 1208.

FIG. 14 illustrates a perspective overview of said sliding bracket 702, said support bracket 1304 and said one or more slotted plates 1208.

Illustrated here are portions of said lower portion 1300 without said box 1202.

In one embodiment, said one or more slotted plates 1208 can comprise a first slotted plate 1400a, and a second slotted plate 1400b.

Said support bracket 1304 can comprise a horizontal portion 1402 and a vertical portion 1404.

Said lower portion 1300 can further comprise a horizontal support bar 1406. In one embodiment, said horizontal portion 1402 can attach to said horizontal support bar 1406, said vertical portion 1404 can attach to said sliding bracket 702, and said one or more slotted plates 1208 can attach to said horizontal support bar 1406. In one embodiment, said first slotted plate 1400a can attach to a first end 1408 of said horizontal support bar 1406 and said second slotted plate 1400b can attach to a second end 1410 of said horizontal support bar 1406. In one embodiment, a weld can be used to hold each of said one or more slotted plates 1208, said horizontal support bar 1406, said support bracket 1304, and said sliding bracket 702 together.

In one embodiment, said horizontal support bar 1406 can comprise a width equal to that of said width 1222 for all said lower portion 1300.

Figure 15A:
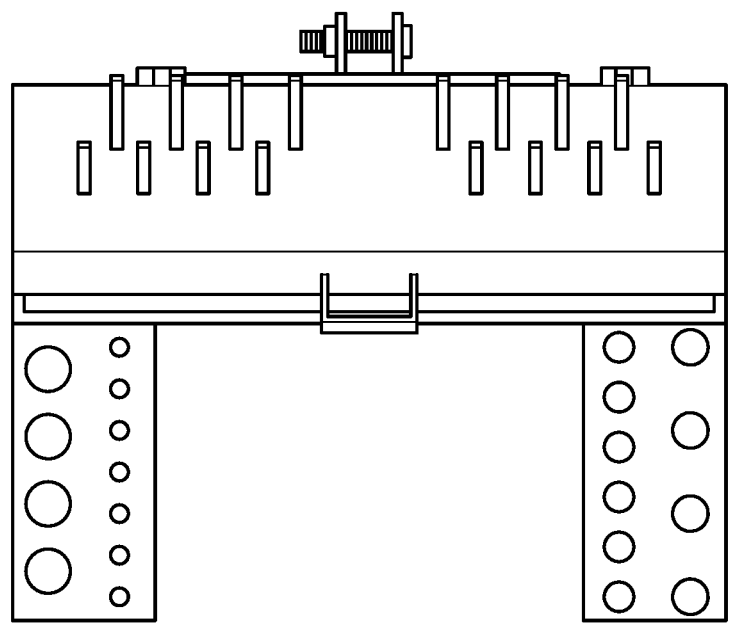
FIGS. 15A and 15B illustrate an elevated top and front view of said toolbox accessory assembly 1200.
Figure 15B:
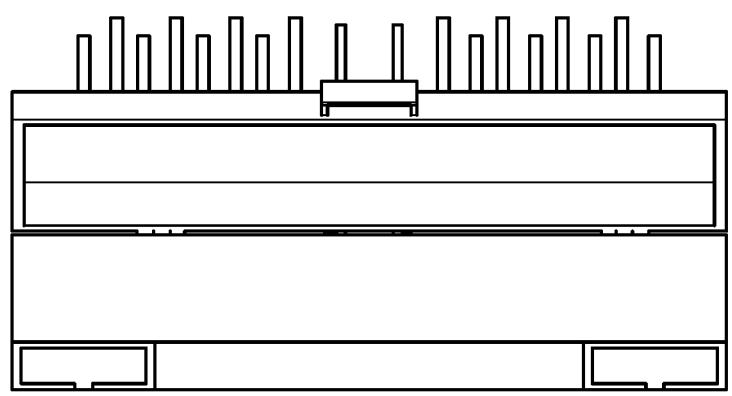

FIGS. 15A and 15B illustrate an elevated top and front view of said toolbox accessory assembly 1200.

Figure 16:
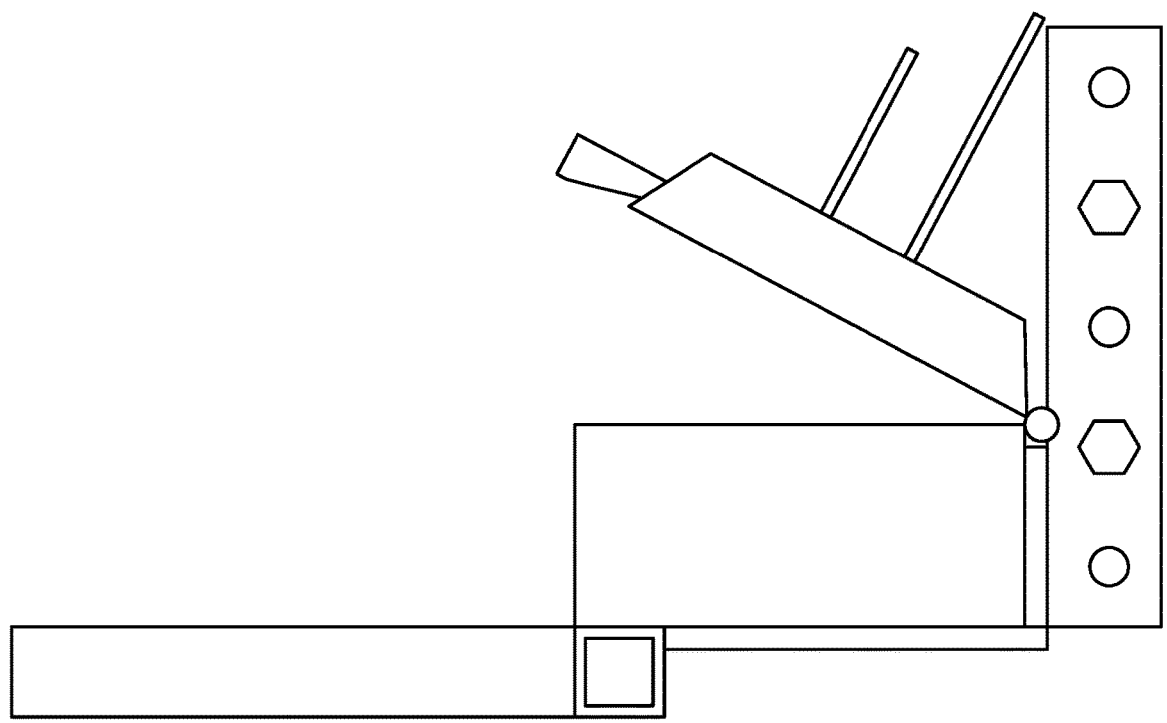
FIG. 16 illustrates an elevated side view of said toolbox accessory assembly 1200.

FIG. 16 illustrates an elevated side view of said toolbox accessory assembly 1200.

Figure 17:
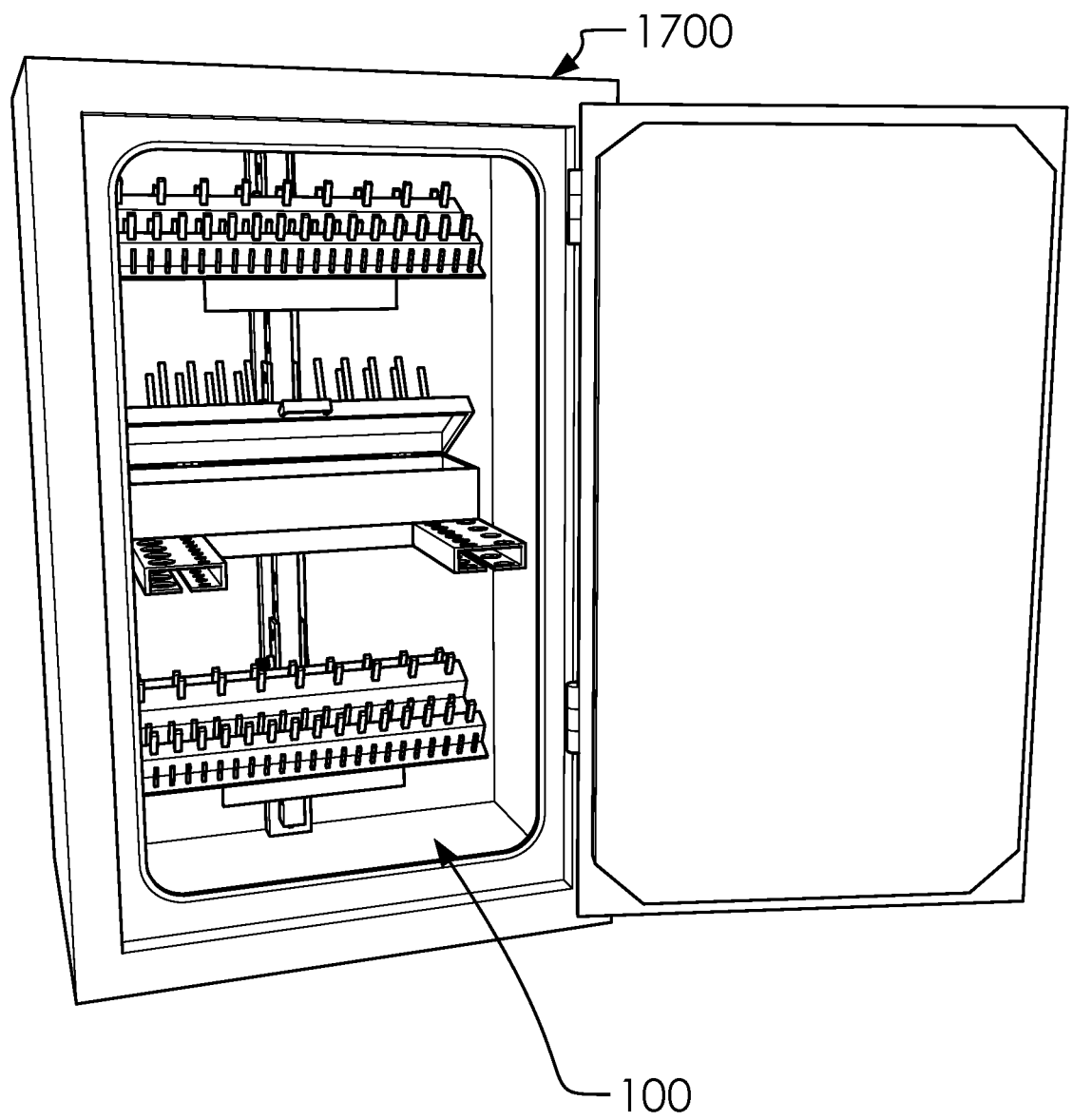
FIG. 17 illustrates a perspective overview of said toolbox accessory system 100 in a flat backed box configuration 1700.

FIG. 17 illustrates a perspective overview of said toolbox accessory system 100 in a flat backed box configuration 1700.

Figure 18:
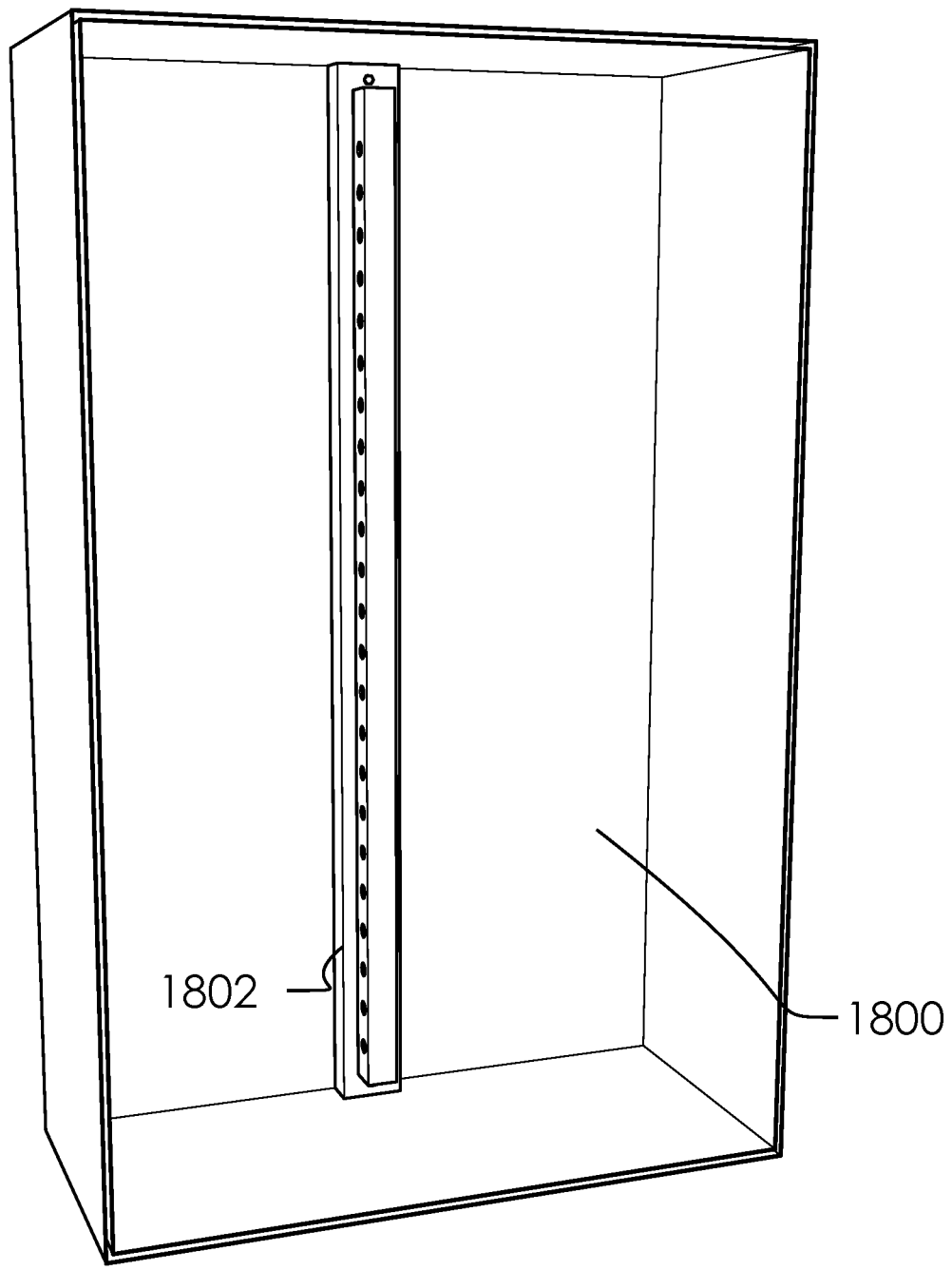
FIG. 18 illustrates a cross-section view of said flat backed box configuration 1700 with a flat back interior surface 1800 and a single rail assembly 1802.

FIG. 18 illustrates a cross-section view of said flat backed box configuration 1700 with a flat back interior surface 1800 and a single rail assembly 1802.

Figure 19:
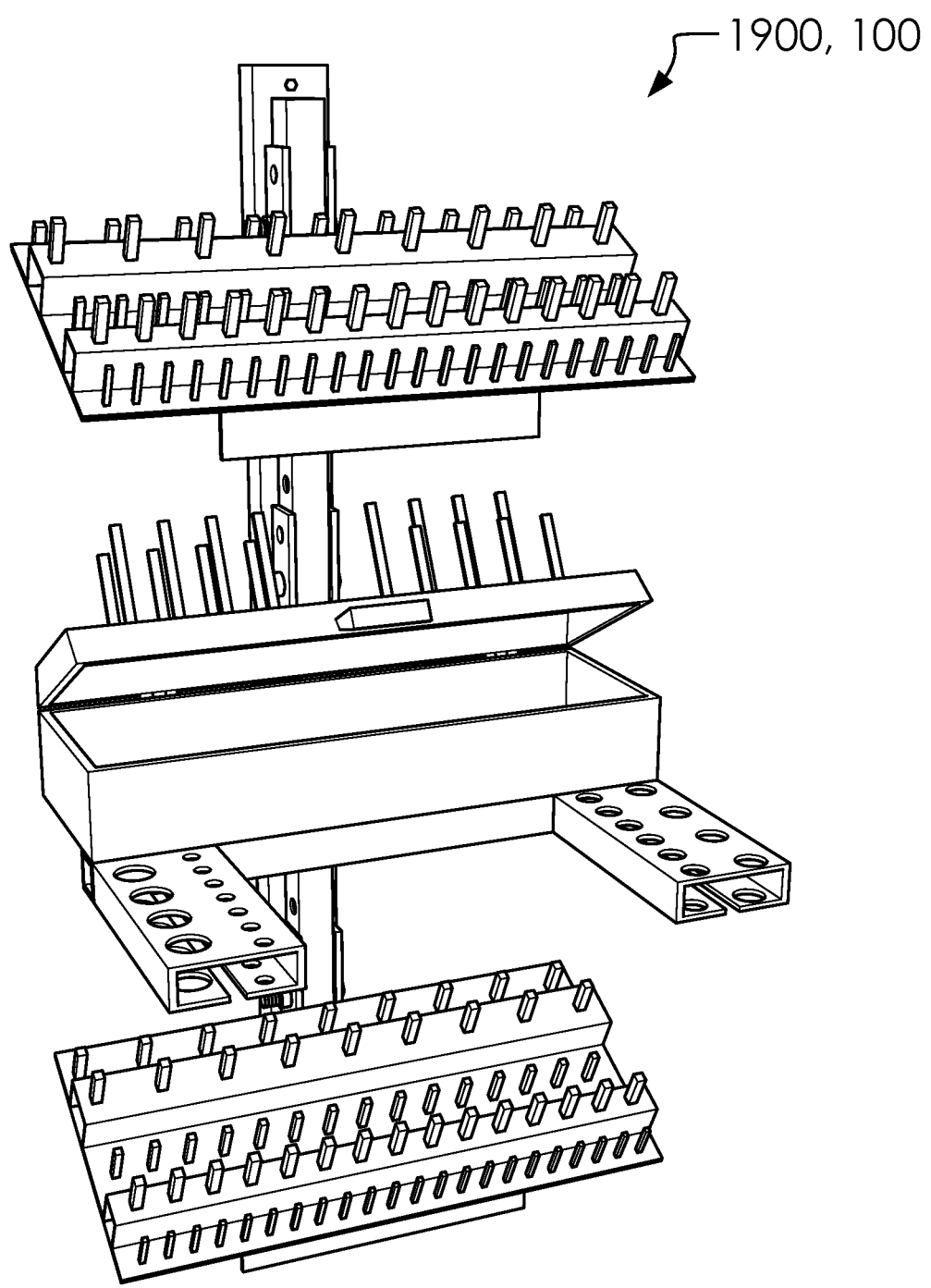
FIGS. 19 and 20 illustrate a perspective overview and elevated side view of said one or more accessory assemblies 208 attached to said single rail assembly 1802 in a stacked configuration 1900, respectively.
Figure 20:
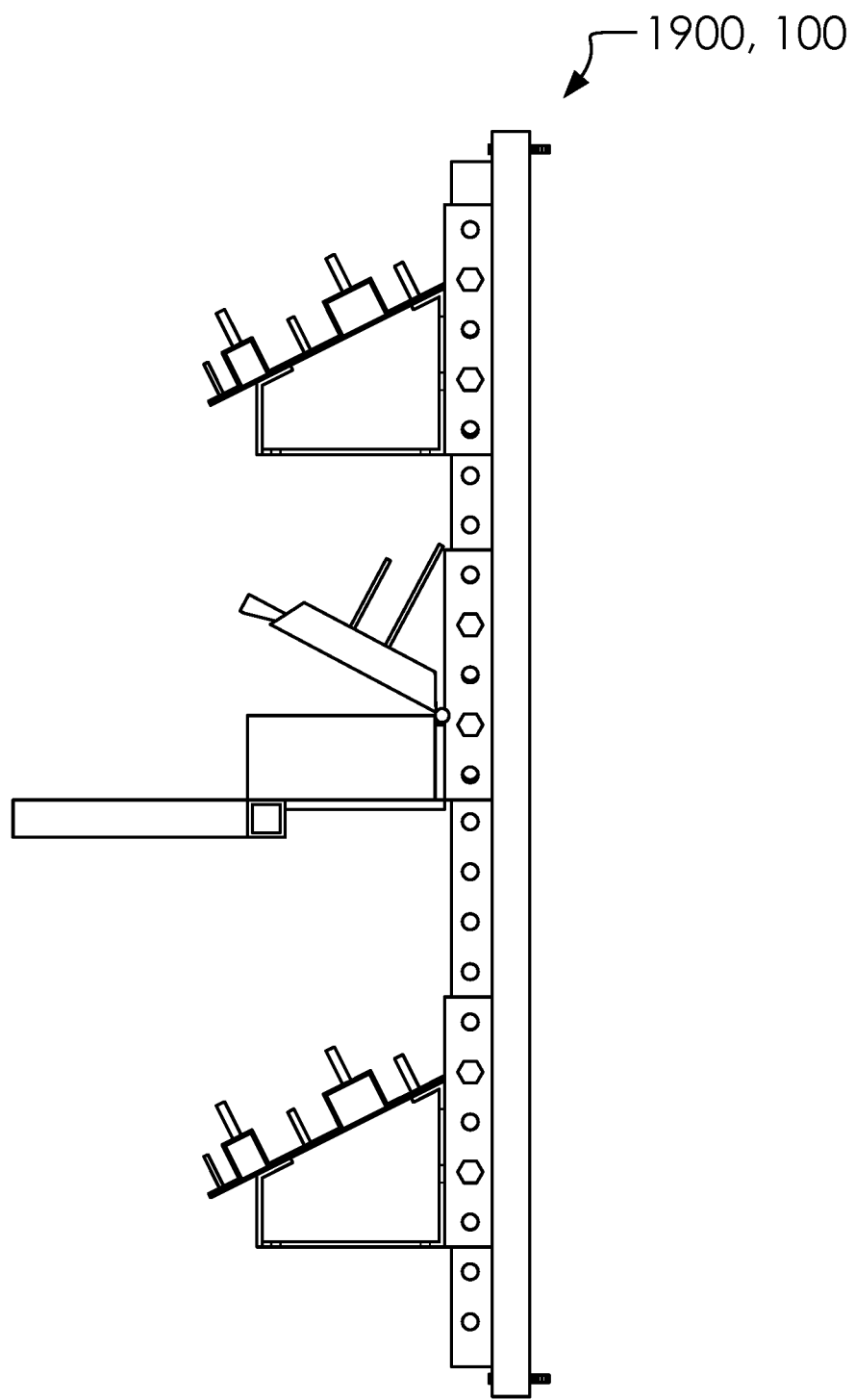

FIGS. 19 and 20 illustrate a perspective overview and elevated side view of said one or more accessory assemblies 208 attached to said single rail assembly 1802 in a stacked configuration 1900, respectively.

In one embodiment, said one or more utility boxes 104 can comprise said flat backed box configuration 1700 wherein said one or more back walls 204 consist of only said flat back interior surface 1800. Wherein, said one or more rail assemblies 206 can comprise of only said first rail assembly 206a also referred to as said single rail assembly 1802.

Figure 21A:
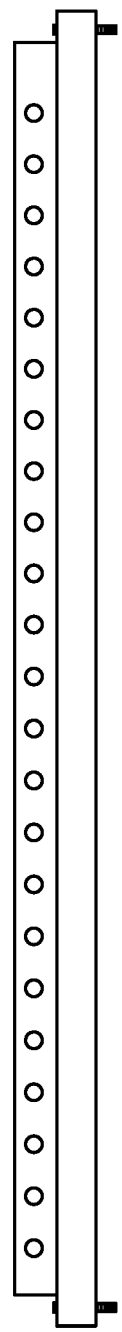
FIGS. 21A and 21B illustrate an elevated side and front view of said single rail assembly 1802.
Figure 21B:
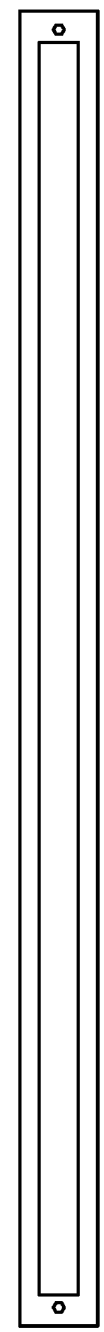

FIGS. 21A and 21B illustrate an elevated side and front view of said single rail assembly 1802.

Figure 22:
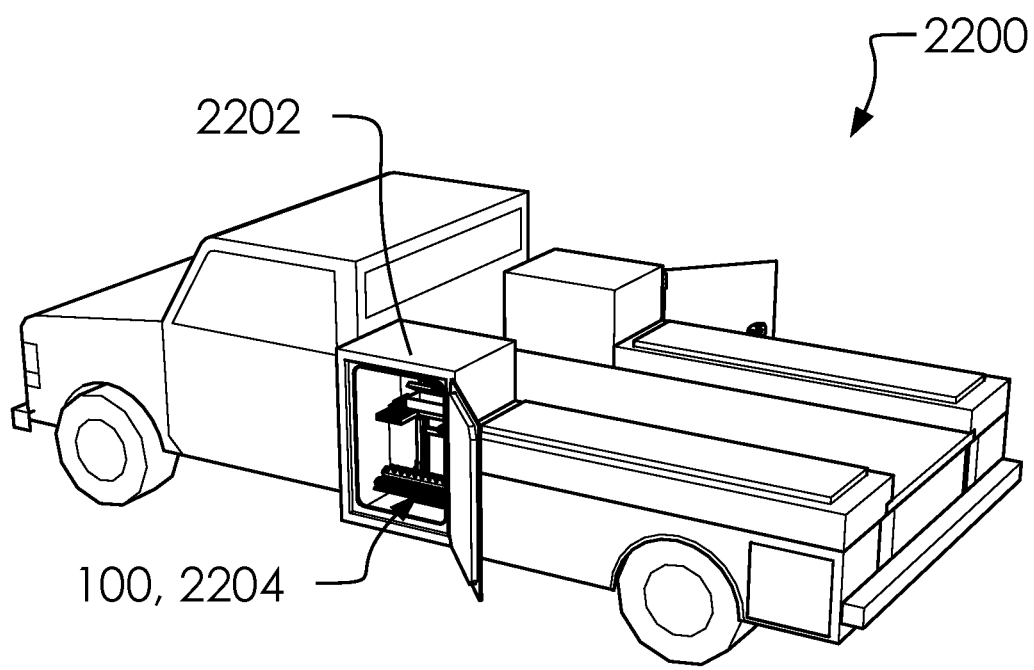
FIG. 22 illustrates a perspective overview of a long bed truck 2200.

FIG. 22 illustrates a perspective overview of a long bed truck 2200.

In one embodiment, said long bed truck 2200 can be similar to said truck 102, but said one or more utility boxes 104 can comprise a wide utility box configuration 2202, as illustrated. Wherein, said toolbox accessory system 100 may need to be modified to fit within said wide utility box configuration 2202 with a wide configuration 2204.

Figure 23:
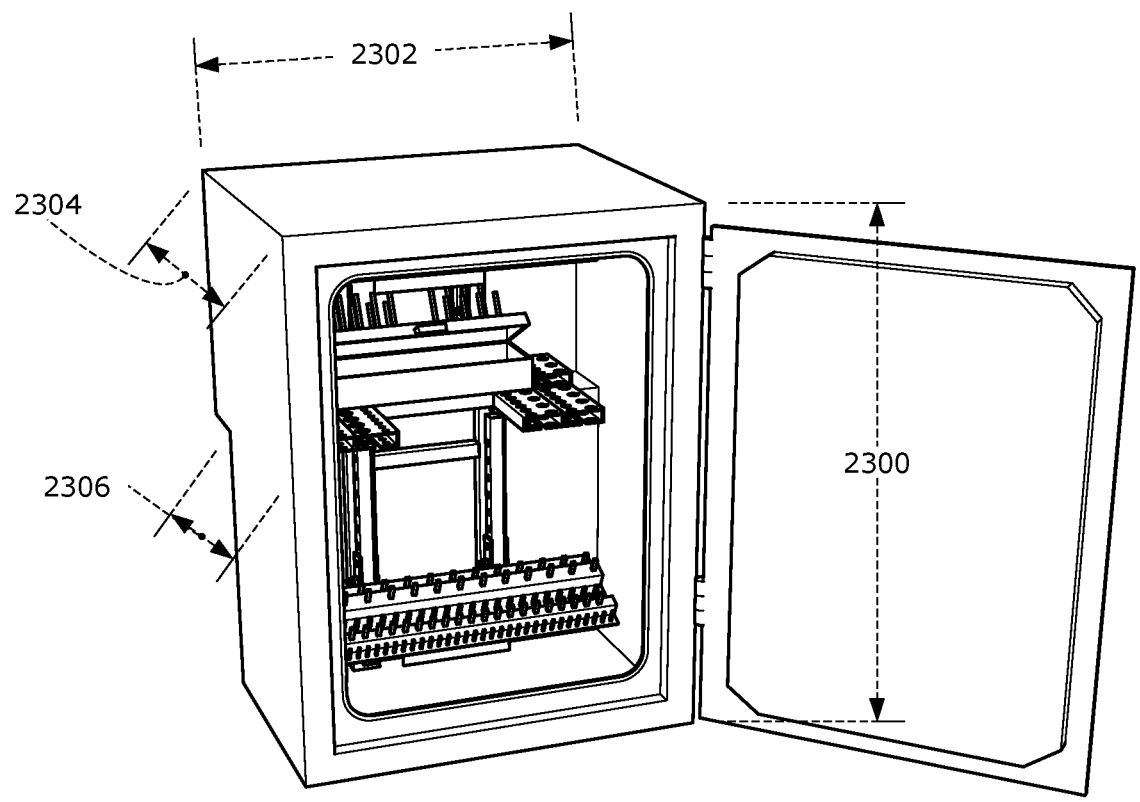
FIG. 23 illustrates a perspective overview of a wide utility box configuration 2202.

FIG. 23 illustrates a perspective overview of said wide utility box configuration 2202.

Said wide utility box configuration 2202 of said one or more utility boxes 104 can comprise a height 2300, a width 2302, a first depth 2304 and a second depth 2306, as illustrated.

Figure 24:
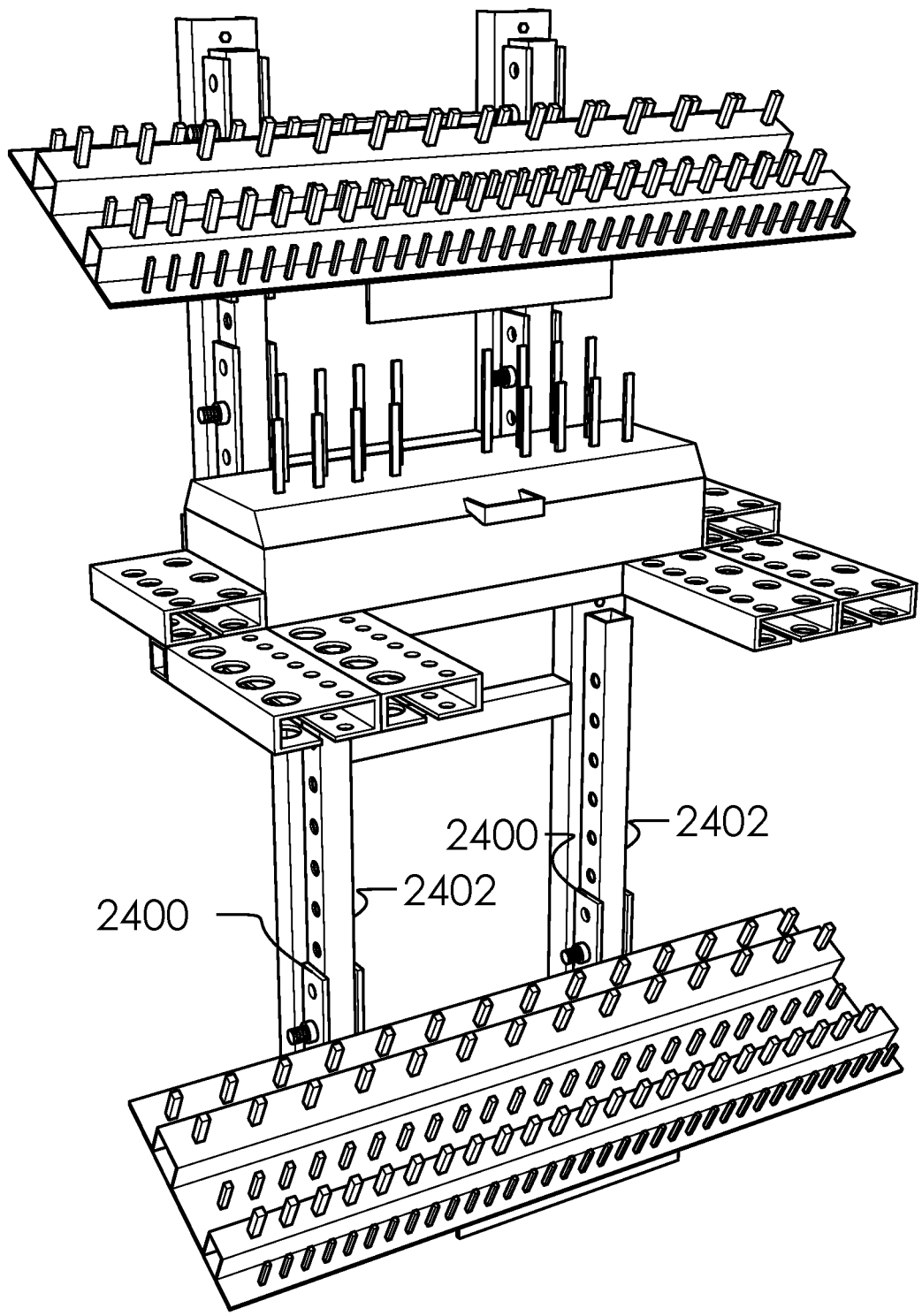
FIGS. 24 and 25A illustrate a perspective overview and an elevated side view of a wide configuration 2204 of said toolbox accessory system 100, respectively.
Figure 25A:
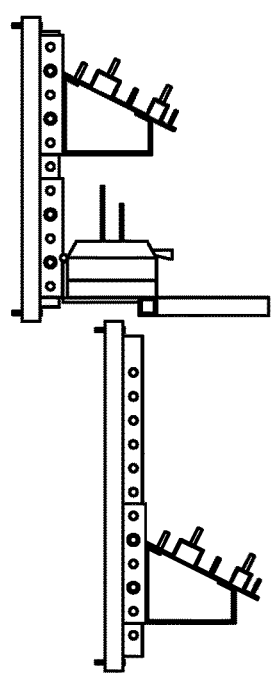

FIGS. 24 and 25A illustrate a perspective overview and an elevated side view of said wide configuration 2204 of said toolbox accessory system 100, respectively.

In one embodiment, said toolbox accessory system 100 can comprise said wide configuration 2204. Said wide configuration 2204 can comprise said one or more accessory assemblies 208 with wide configurations. For example, said pegged tool holder assembly 700 and said toolbox accessory assembly 1200 can comprise a two sliding brackets 2400 and a greater width for said wide configuration 2204. Likewise, said one or more rail assemblies 206 can comprise a two parallel rails 2402 aligned on said one or more back walls 204 for holding said one or more accessory assemblies 208.

As illustrated, said two parallel rails 2402 can be split similar to said first rail assembly 206a and said second rail assembly 206b attached to said lower backwall 300 and said upper backwall 302, as discussed above.

Figures 25B, 25C:
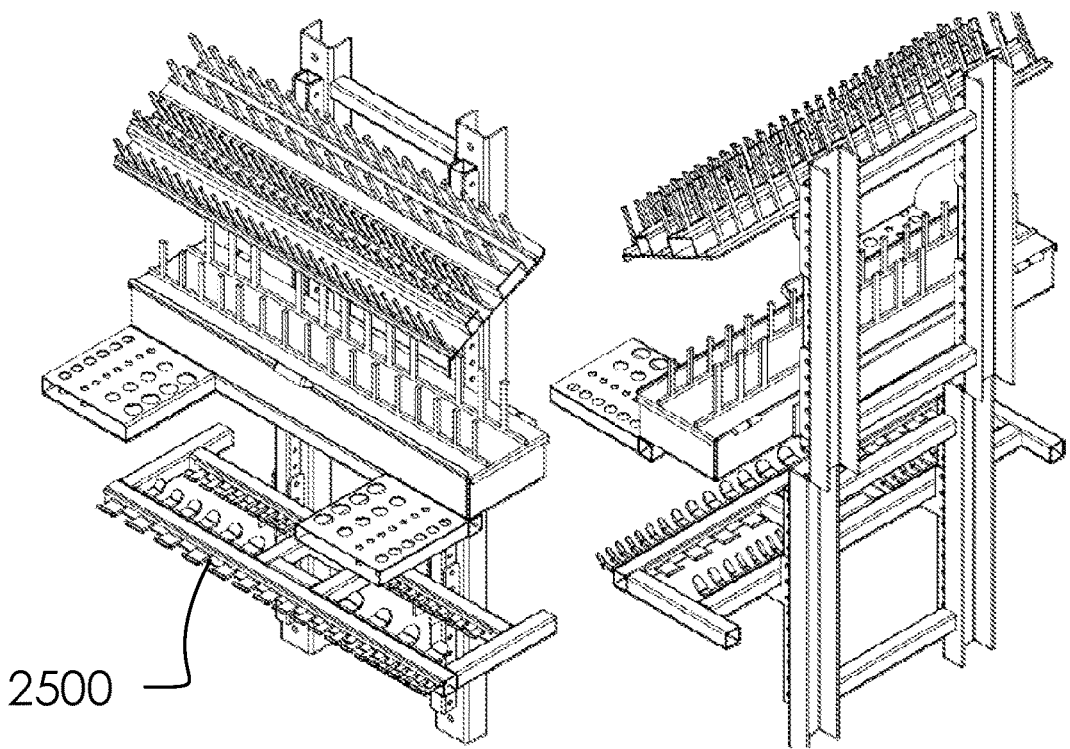
FIGS. 25B, and 25C illustrate a perspective overview of said wide configuration 2204 comprising a drive socket holder assembly 2500.

FIGS. 25B, and 25C illustrate a perspective overview of said wide configuration 2204 comprising a drive socket holder assembly 2500.

In one embodiment, said drive socket holder assembly 2500 can receive and hold sockets for a socket wrench, as is known in the art.

Figure 26:
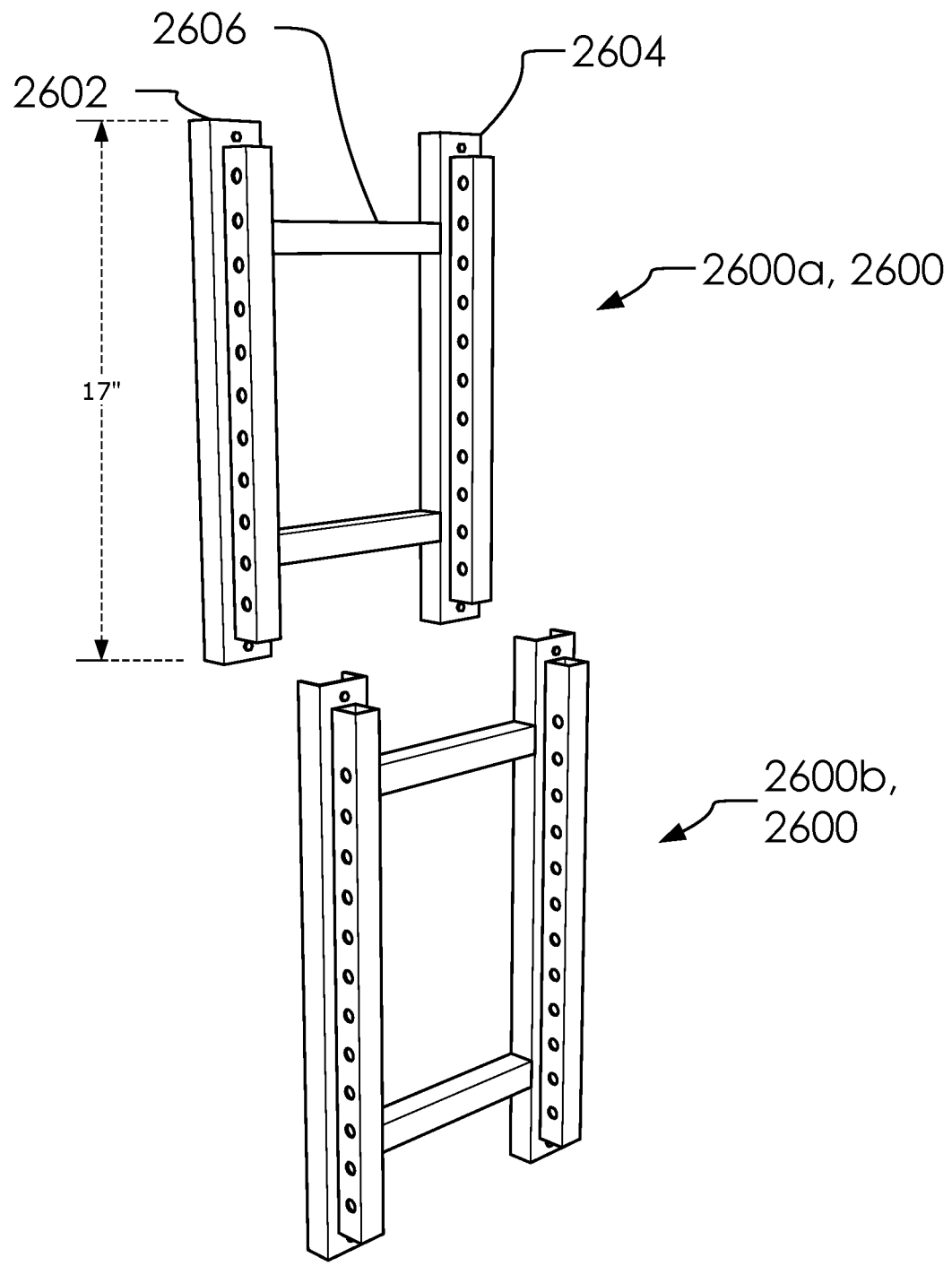
FIG. 26 illustrates a perspective overview a two parallel rails 2402.

FIG. 26 illustrates a perspective overview said two parallel rails 2402.

In one embodiment, said two parallel rails 2402 can comprise one or more sets of rails 2600. 2600/can comprise a first set of rails 2600a, and a second set of rails 2600b. each of said one or more sets of rails 2600 can comprise a first rail 2602 and a second rail 2604, arranged in parallel and with one or more support bars 2606 arranged between one another.

In one embodiment, said two parallel rails 2402 can comprise a single set of said one or more sets of rails 2600, arranged along a single back surface of said one or more utility boxes 104, as discussed herein.

In one embodiment, each among said one or more sets of rails 2600 can comprise one or more rail lengths 2608. In one embodiment, said one or more rail lengths 2608 can comprise a first rail length 2608a for said first set of rails 2600a and a second rail length 2608b for said second set of rails 2600b. One feature of said toolbox accessory system 100 can comprise adjusting the dimensions of said one or more sets of rails 2600 and or said one or more rail assemblies 206 to fit those of said one or more back walls 204 of said utility box 104a. Accordingly, said toolbox accessory system 100 can comprise a versatility not found in other tool box organizers found on the market. Since said one or more accessory assemblies 208 are secured to said one or more back walls 204 by way of said one or more rail assemblies 206, said toolbox accessory system 100 is known to be safer and more versatile than prior tool box systems. Likewise, because said one or more rail assemblies 206 can be efficiently arranged withing said utility box 104a, space within said utility box 104a is better utilized.

FIGS. 27A, 27B, and 27C illustrate a perspective overview and lower back side view of said pegged tool holder assembly 700 and said pegged tool holder assembly 800 in a wide configuration 2700.

In one embodiment, said wide configuration 2700 of said pegged tool holder assembly 700 can comprise an increased width 2702, additional said plurality of pegs 708, and said two sliding brackets 2400.

FIGS. 28A, 28B, and 28C illustrate a perspective overview, lower back side view, and a perspective overview of said toolbox accessory assembly 1200 in a wide configuration 2800.

In one embodiment, said wide configuration 2800 of said toolbox accessory assembly 1200 can comprise an increased width 2802 (as compared with said width 1222), and the addition of more of said one or more slotted plates 1208, as illustrated.

As shown in FIG. 28C, said box 1202 can comprise a squared off version of said hinged lid 1212, as discussed above.

Figure 29:
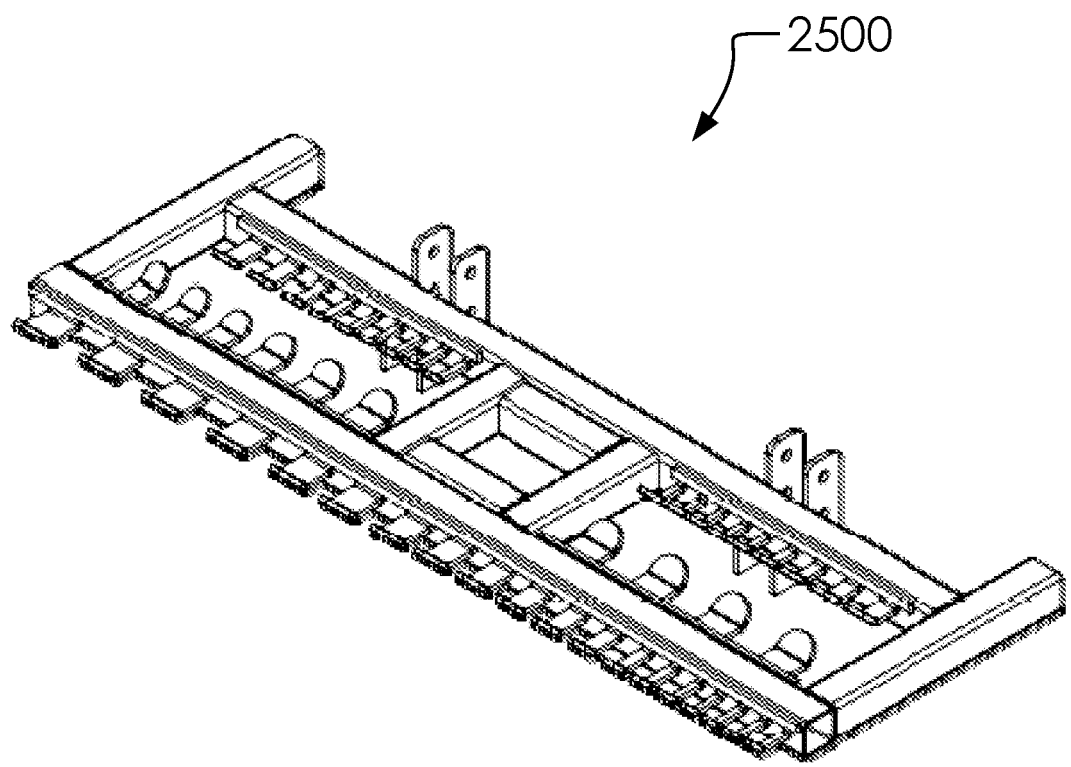
FIG. 29 illustrates a perspective overview of said drive socket holder assembly 2500.

FIG. 29 illustrates a perspective overview of said drive socket holder assembly 2500.

Parts discussed in this patent include:
said toolbox accessory system 100,
said truck 102,
said one or more utility boxes 104,
said utility box 104a,
said second utility box 104b,
said flat floor 106,
said door 200,
said compartment 202,
said one or more back walls 204,
said one or more rail assemblies 206,
said first rail assembly 206a,
said second rail assembly 206b,
said one or more accessory assemblies 208,
said first accessory assembly 208a,
said second accessory assembly 208b,
said third accessory assembly 208c,
said front opening 210,
said height 212,
said depth 214,
said width 216,
said open configuration 218,
said box shell 220,
said lower backwall 300,
said upper backwall 302,
said first depth 304,
said second depth 306,
said horizontal shelf 308,
said top portion 310,
said bottom portion 312,
said two side walls 314,
said vertical configuration 316,
said backing portion 400,
said mounting rail 402,
said one or more fasteners 404,
said width 406,
said length 408,
said depth 410,
said width 412,
said depth 414,
said length 416,
said first end 418,
said second end 420,
said one or more apertures 422,
said first aperture 422a, said second aperture 422b,
said side portion 424,
said pegged tool holder assembly 700,
said sliding bracket 702,
said support bracket 704,
said peg board 706,
said plurality of pegs 708,
said one or more raised planes 710,
said first plate 712,
said second plate 714,
said one or more apertures 716,
said one or more fasteners 718,
said backside 720,
said top face 722,
said one or more fasteners 724,
said pegged tool holder assembly 800,
said accessory portion 802,
said mounting surface 900,
said slope angle 902,
said tabbed accessory assembly 1000,
said toolbox accessory assembly 1200,
said box 1202,
said open configuration 1204,
said closed configuration 1206,
said one or more slotted plates 1208,
said plurality of pegs 1210,
said hinged lid 1212,
said top surface 1214,
said plurality of slots 1216,
said bottom plane 1218,
said top plane 1220,
said width 1222,
said gap 1224,
said gap width 1226,
said width 1228,
said lower portion 1300,
said hinge 1302,
said support bracket 1304,
said first slotted plate 1400a,
said second slotted plate 1400b,
said horizontal portion 1402,
said vertical portion 1404,
said horizontal support bar 1406,
said first end 1408,
said second end 1410,
said flat backed box configuration 1700,
said flat back interior surface 1800,
said single rail assembly 1802,
said stacked configuration 1900,
said long bed truck 2200,
said wide utility box configuration 2202,
said wide configuration 2204,
said height 2300,
said width 2302,
said first depth 2304,
said second depth 2306,
said two sliding brackets 2400,
said two parallel rails 2402,
said drive socket holder assembly 2500,
said one or more sets of rails 2600,
said first set of rails 2600a,
said second set of rails 2600b,
said first rail 2602,
said second rail 2604,
said one or more support bars 2606,
said wide configuration 2700,
said increased width 2702,
said wide configuration 2800,
and
said increased width 2802.

The following description of said toolbox accessory system 100 is included to ensure all subject matter found in the original claims will also be found in the specification.

Said toolbox accessory system 100 for organizing and utilizing said utility box 104a of said truck 102. Said toolbox accessory system 100 comprises said one or more rail assemblies 206 attached to said one or more back walls 204 of said utility box 104a. Said toolbox accessory system 100 comprises said one or more accessory assemblies 208 configured to selectively attach to said one or more rail assemblies 206. Said one or more accessory assemblies 208 can be configured to selectively store tools within said one or more utility boxes 104. Said one or more accessory assemblies 208 can be attached in a vertical configuration along said one or more back walls 204 of said one or more utility boxes 104. Said box shell 220 comprises said one or more back walls 204, said top portion 310, said bottom portion 312, said two side walls 314, and said front opening 210. Said one or more rail assemblies 206 can be arranged between said top portion 310 and said bottom portion 312 in said vertical configuration 316.

Said one or more back walls 204 comprises said lower backwall 300 and said upper backwall 302. Said lower backwall 300 can be set back said first depth 304 and said upper backwall 302 can be set back said second depth 306. Said one or more back walls 204 comprises a plurality of planar surfaces, as opposed to a single planar surface. Said one or more rail assemblies 206 comprises said first rail assembly 206a and said second rail assembly 206b. Said first rail assembly 206a attaches to said upper backwall 302 and said second rail assembly 206b can be configured to attach to said lower backwall 300.

Said one or more rail assemblies 206 comprises at least said mounting rail 402. Said mounting rail 402 comprises said width 412 and said depth 414 and said length 416. Said mounting rail 402 can be configured selectively attach to a portion of said one or more back walls 204 and selectively receive and hold said one or more accessory assemblies 208. Said mounting rail 402 comprises said side portion 424 having said one or more apertures 422. Said one or more apertures 422 comprise at least said first aperture 422a, and said second aperture 422b. Said one or more accessory assemblies 208 can be configured to attach to said one or more apertures 422.

Said one or more rail assemblies 206 comprises said backing portion 400, and said one or more fasteners 404. Said backing portion 400 comprises said width 406, said length 408, and said depth 410. Said backing portion 400 can be attached to said mounting rail 402 by welding the two parts together. Said one or more rail assemblies 206 can be configured to selectively attach to portions of said one or more back walls 204 by attaching said mounting rail 402 to said backing portion 400, and selectively attaching said backing portion 400 to said one or more back walls 204 with said one or more fasteners 404.

Said backing portion 400 a u-shaped bracket.

each among said one or more accessory assemblies 208 comprise said sliding bracket 702. Said sliding bracket 702 can be configured to selectively attach said one or more accessory assemblies 208 to said one or more rail assemblies 206.

Said sliding bracket 702 comprises said first plate 712 and said second plate 714 arranged parallel to one another with said one or more apertures 716 for receiving and holding said one or more fasteners 718.

Said sliding bracket 702 can be configured to attach to said one or more rail assemblies 206 by arranging said first plate 712 and said second plate 714 on either side of said mounting rail 402, and sliding a portion of said one or more fasteners 718 through said one or more apertures 716 in said first plate 712, a portion of said one or more apertures 422 of said mounting rail 402, and said one or more apertures 716 in said second plate 714.

each among said one or more accessory assemblies 208 comprises said support bracket 704 and said accessory portion 802. Said sliding bracket 702 can be configured to selectively attach to said one or more rail assemblies 206. Said support bracket 704 can be configured to attach to said sliding bracket 702. Said accessory portion 802 comprises useful parts of said one or more accessory assemblies 208 for organizing tools or objects within said one or more utility boxes 104.

Said one or more accessory assemblies 208 comprises said pegged tool holder assembly 700. Said accessory portion 802 of said pegged tool holder assembly 700 comprises said plurality of pegs 708.

Said one or more accessory assemblies 208 comprises said tabbed accessory assembly 1000. Said accessory portion 802 of said pegged tool holder assembly 700 comprises a plurality of pegs.

Said one or more accessory assemblies 208 comprises said toolbox accessory assembly 1200. Said accessory portion 802 of said toolbox accessory assembly 1200 comprises at least said box 1202.

Said toolbox accessory assembly 1200 comprises said box 1202, said one or more slotted plates 1208, and said sliding bracket 702. Said box 1202 comprises said plurality of pegs 1210 with said hinged lid 1212. Said plurality of pegs 1210 can be arranged on said top surface 1214 of said hinged lid 1212. Said box 1202 comprises said open configuration 1204 and said closed configuration 1206 said one or more slotted plates 1208 comprises said plurality of slots 1216 arranged and aligned on said bottom plane 1218 and said top plane 1220, as illustrated. Said toolbox accessory assembly 1200 comprises said width 1222, said gap 1224 between said one or more slotted plates 1208 comprises said gap width 1226, and each of said one or more slotted plates 1208 comprises said width 1228.

Said box 1202 comprises said lower portion 1300 being attached to said hinged lid 1212 with said hinge 1302.

Said support bracket 704 can be configured to extend horizontally out from said sliding bracket 702 and support said accessory portion 802 of said one or more accessory assemblies 208.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A toolbox accessory system for organizing and utilizing a utility box of a truck, wherein:
said toolbox accessory system comprises one or more rail assemblies attached to one or more back walls of said utility box;
said toolbox accessory system comprises one or more accessory assemblies configured to selectively attach to said one or more rail assemblies;
said one or more accessory assemblies are configured to selectively store tools within said utility box;
said one or more accessory assemblies are attached in a substantially vertical configuration along said one or more back walls of said utility box;
said utility box comprises a box shell having said one or more back walls, a top portion, a bottom portion, two side walls, and a front opening;
said one or more rail assemblies are arranged between said top portion and said bottom portion in a vertical configuration;
said one or more back walls comprise a lower backwall and an upper backwall;
said lower backwall is set back a first depth and said upper backwall is set back a second depth;
said one or more back walls comprise a plurality of planar surfaces, as opposed to a single planar surface;
said one or more rail assemblies comprises a first rail assembly and a second rail assembly; and
said first rail assembly attaches to said upper backwall and said second rail assembly is configured to attach to said lower backwall.

2. The toolbox accessory system of claim 1, wherein:
said utility box comprises a flat backed box configuration wherein said one or more back walls consist of only a flat back interior surface;
wherein, said one or more rail assemblies comprises of only said first rail assembly also referred to as a single rail assembly; and
said single rail assembly extends between said top portion and said bottom portion of said box shell.

3. The toolbox accessory system of claim 1, wherein:
said one or more rail assemblies comprises at least a mounting rail;
said mounting rail comprises a width and a depth and a length;
said mounting rail is configured selectively attach to a portion of said one or more back walls and selectively receive and hold said one or more accessory assemblies;
said mounting rail comprises a side portion having one or more apertures;
said one or more apertures comprise at least a first aperture, and a second aperture; and
said one or more accessory assemblies are configured to attach to said one or more apertures.

4. The toolbox accessory system of claim 3, wherein:
said one or more rail assemblies comprises a backing portion, and one or more fasteners;
said backing portion comprises a width, a length, and a depth;
said backing portion is attached to said mounting rail by welding the two parts together;
said one or more rail assemblies are configured to selectively attach to portions of said one or more back walls by attaching said mounting rail to said backing portion, and selectively attaching said backing portion to said one or more back walls with said one or more fasteners.

5. The toolbox accessory system of claim 4, wherein:
said backing portion a C-bracket.

6. The toolbox accessory system of claim 3, wherein:
each among said one or more accessory assemblies comprise a sliding bracket; and
said sliding bracket is configured to selectively attach said one or more accessory assemblies to said one or more rail assemblies.

7. The toolbox accessory system of claim 6, wherein:
said sliding bracket comprises a first plate and a second plate arranged parallel to one another with one or more apertures for receiving and holding one or more fasteners.

8. The toolbox accessory system of claim 7, wherein:
said sliding bracket is configured to attach to said one or more rail assemblies by
arranging said first plate and said second plate on either side of said mounting rail, and
sliding a portion of said one or more fasteners through said one or more apertures in said first plate, a portion of said one or more apertures of said mounting rail, and said one or more apertures in said second plate.

9. The toolbox accessory system of claim 1, wherein:
each among said one or more accessory assemblies comprises a support bracket a sliding bracket and an accessory portion;
said sliding bracket is configured to selectively attach to said one or more rail assemblies;
said support bracket is configured to attach to said sliding bracket; and
said accessory portion comprises useful parts of said one or more accessory assemblies for organizing tools or objects within said utility box.

10. The toolbox accessory system of claim 9, wherein:
said one or more accessory assemblies comprises a pegged tool holder assembly; and
said accessory portion of said pegged tool holder assembly comprises plurality of pegs.

11. The toolbox accessory system of claim 9, wherein:
said one or more accessory assemblies comprises a tabbed accessory assembly; and
said accessory portion of said pegged tool holder assembly comprises a plurality of pegs.

12. The toolbox accessory system of claim 9, wherein:
said one or more accessory assemblies comprises a toolbox accessory assembly; and
said accessory portion of said toolbox accessory assembly comprises at least a box.

13. The toolbox accessory system of claim 12, wherein:
said toolbox accessory assembly comprises said box, one or more slotted plates, and said sliding bracket;
said box comprises a plurality of pegs with a hinged lid;
said plurality of pegs is arranged on a top surface of said hinged lid;
said box comprises an open configuration and a closed configuration;
said one or more slotted plates comprises a plurality of slots arranged and aligned on a bottom plane and a top plane, as illustrated; and said toolbox accessory assembly comprises a width, a gap between said one or more slotted plates comprises a gap width, and each of said one or more slotted plates comprises a width.

14. The toolbox accessory system of claim 13, wherein:
said box comprises a lower portion being attached to said hinged lid with a hinge.

15. The toolbox accessory system of claim 9, wherein:
said support bracket is configured to extend horizontally out from said sliding bracket and support said accessory portion of said one or more accessory assemblies.

16. The toolbox accessory system of claim 1, wherein:
said pegged tool holder assembly and said toolbox accessory assembly comprise two sliding brackets; and
said one or more rail assemblies comprises two parallel rails aligned on said one or more back walls for holding said one or more accessory assemblies.

17. The toolbox accessory system of claim 16, wherein:
said two parallel rails are split with a first portion of said two parallel rails attached to said lower backwall and a second portion of said two parallel rails attached to said upper backwall;
said two parallel rails comprises a first set of rails, and a second set of rails arranged in parallel;
said two parallel rails comprise one or more support bars arranged between one another.

18. A toolbox accessory system for organizing and utilizing a utility box of a truck, wherein:
said toolbox accessory system comprises one or more rail assemblies attached to one or more interior walls of said utility box;
said toolbox accessory system comprises one or more accessory assemblies configured to selectively attach to said one or more rail assemblies;
said one or more accessory assemblies are configured to selectively store tools within said utility box;
said one or more accessory assemblies are attached in a substantially vertical configuration along said one or more interior walls of said utility box;
said utility box comprises a box shell having said one or more interior walls, a top portion, a bottom portion, two side walls, and a front opening;
said one or more rail assemblies are arranged between said top portion and said bottom portion in a vertical configuration;
said one or more rail assemblies comprises at least a mounting rail;
said mounting rail comprises a width and a depth and a length;
said mounting rail is configured selectively attach to a portion of said one or more interior walls and selectively receive and hold said one or more accessory assemblies;
said mounting rail comprises a side portion having one or more apertures;
said one or more apertures comprise at least a first aperture, and a second aperture;
said one or more accessory assemblies are configured to attach to said one or more apertures;
said one or more rail assemblies comprises a backing portion, and one or more fasteners;
said backing portion comprises a width, a length, and a depth;
said backing portion is attached to said mounting rail by welding the two parts together;

said one or more rail assemblies are configured to selectively attach to portions of said one or more interior walls by
attaching said mounting rail to said backing portion, and
selectively attaching said backing portion to said one or more interior walls with said one or more fasteners.

19. A toolbox accessory system for organizing and utilizing a utility box of a truck, wherein:
said toolbox accessory system comprises one or more rail assemblies attached to one or more back walls of said utility box;
said toolbox accessory system comprises one or more accessory assemblies configured to selectively attach to said one or more rail assemblies;
said one or more accessory assemblies are configured to selectively store tools within said utility box;
said one or more accessory assemblies are attached in a substantially vertical configuration along said one or more back walls of said utility box;
said utility box comprises a box shell having said one or more back walls, a top portion, a bottom portion, two side walls, and a front opening;
said one or more rail assemblies are arranged between said top portion and said bottom portion in a vertical configuration;
each among said one or more accessory assemblies comprises a support bracket, a sliding bracket and an accessory portion;
said sliding bracket is configured to selectively attach to said one or more rail assemblies;
said support bracket is configured to attach to said sliding bracket; and
said accessory portion comprises useful parts of said one or more accessory assemblies for organizing tools or objects within said utility box.

20. A toolbox accessory system for organizing and utilizing a utility box of a truck, wherein:
said toolbox accessory system comprises one or more rail assemblies attached to one or more back walls of said utility box;
said toolbox accessory system comprises one or more accessory assemblies configured to selectively attach to said one or more rail assemblies;
said one or more accessory assemblies are configured to selectively store tools within said utility box;
said one or more accessory assemblies are attached in a substantially vertical configuration along said one or more back walls of said utility box;
said utility box comprises a box shell having said one or more back walls, a top portion, a bottom portion, two side walls, and a front opening;
said one or more rail assemblies are arranged between said top portion and said bottom portion in a vertical configuration;
said pegged tool holder assembly and said toolbox accessory assembly comprise two sliding brackets; and
said one or more rail assemblies comprises two parallel rails aligned on said one or more back walls for holding said one or more accessory assemblies.

* * * * *